US009327294B2

(12) United States Patent
Rothman et al.

(10) Patent No.: US 9,327,294 B2
(45) Date of Patent: May 3, 2016

(54) SYNTHETIC BUBBLES OR BEADS HAVING HYDROPHOBIC SURFACE

(75) Inventors: Paul J. Rothman, Windsor, CT (US); Mark R. Fernald, Enfield, CT (US); Francis K. Didden, Wallingford, CT (US); Christian V. O'Keefe, Durham, CT (US); Alan D. Kersey, South Glastonbury, CT (US); Douglas H. Adamson, Mansfield Center, CT (US)

(73) Assignee: CiDRA Corporate Services Inc., Wallingford, CT (US)

( * ) Notice: Subject to any disclaimer, the term of this patent is extended or adjusted under 35 U.S.C. 154(b) by 122 days.

(21) Appl. No.: 14/117,946

(22) PCT Filed: May 25, 2012

(86) PCT No.: PCT/US2012/039596
§ 371 (c)(1),
(2), (4) Date: Feb. 6, 2014

(87) PCT Pub. No.: WO2012/162614
PCT Pub. Date: Nov. 29, 2012

(65) Prior Publication Data
US 2014/0202959 A1    Jul. 24, 2014

Related U.S. Application Data

(60) Provisional application No. 61/489,893, filed on May 25, 2011, provisional application No. 61/533,544, filed on Sep. 12, 2011.

(51) Int. Cl.
| | |
|---|---|
| *B03C 5/00* | (2006.01) |
| *B03D 1/02* | (2006.01) |
| *B01D 37/02* | (2006.01) |
| *C02F 1/24* | (2006.01) |
| *B03D 1/14* | (2006.01) |
| *B01D 39/00* | (2006.01) |
| *C22B 15/00* | (2006.01) |
| *B01D 15/02* | (2006.01) |
| *B03D 1/016* | (2006.01) |
| *B03C 1/01* | (2006.01) |
| *B03C 5/02* | (2006.01) |

(52) U.S. Cl.
CPC . *B03C 5/00* (2013.01); *B01D 15/02* (2013.01); *B01D 37/02* (2013.01); *B01D 39/00* (2013.01); *B03C 1/01* (2013.01); *B03C 5/02* (2013.01); *B03D 1/016* (2013.01); *B03D 1/023* (2013.01); *B03D 1/14* (2013.01); *C02F 1/24* (2013.01); *C22B 15/0063* (2013.01); *Y10T 428/2982* (2015.01)

(58) Field of Classification Search
CPC ........ B01D 15/02; B01D 39/00; B01D 37/02; B03D 1/023; B03D 1/016; B03D 1/14; C22B 15/0063; Y10T 428/2982

USPC ......................................................... 428/403
See application file for complete search history.

(56) References Cited

U.S. PATENT DOCUMENTS

| | | |
|---|---|---|
| 2,585,473 A | 2/1952 | Kennedy |
| 2,699,872 A | 1/1955 | Kelsey |
| 3,224,582 A | 12/1965 | Iannicelli |
| 3,796,308 A | 3/1974 | McIlhinney et al. |
| 4,100,242 A | 7/1978 | Leach |
| 4,177,253 A | 12/1979 | Davies et al. |
| RE30,360 E | 8/1980 | Shubert |
| 4,235,562 A | 11/1980 | Ribas |
| 4,236,995 A | 12/1980 | Kruyer |
| 4,269,699 A | 5/1981 | McCready et al. |
| 4,358,368 A | 11/1982 | Hellsten et al. |
| 4,363,749 A | 12/1982 | Weiss et al. |
| 4,412,843 A | 11/1983 | Burgess et al. |
| 4,511,461 A | 4/1985 | Kruyer |
| 4,532,032 A | 7/1985 | Ng et al. |
| 4,556,482 A | 12/1985 | Nagaraj |
| 4,657,666 A | 4/1987 | Snook et al. |

(Continued)

FOREIGN PATENT DOCUMENTS

| | | |
|---|---|---|
| EP | 0348620 | 1/1990 |
| EP | 1184064 | 3/2002 |
| WO | 8301397 | 4/1983 |
| WO | 8404701 | 12/1984 |
| WO | 02066168 | 8/2002 |
| WO | WO02/086168 | * 8/2002 |
| WO | 2004064997 | 8/2004 |
| WO | 2005066631 | 7/2005 |
| WO | 2010007157 | 1/2010 |

OTHER PUBLICATIONS

Wyss et al. "A novel approach for the extraction of herbicides and pesicides from water using liquid-core microcapsules" by Wyss et al. Biotechnology and Engineering; Aug. 19, 2004; abstract, 3 pages.
Krishna et al. "Synthesis of xanthate functionalized silica gel and its application for the preconcentration and separation of uranium (VI) from inorganic components." Journal of Radioanalytical and Nuclear Chemistry. vol. 266, No. 2 (2005) 251-257.

(Continued)

*Primary Examiner* — Leszek Kiliman

(57) ABSTRACT

A synthetic bead for use in mineral separation is described. The synthetic bead has a surface made of or coated with a synthetic material such as a polymer that is naturally hydrophobic or a polymer that is hydrophobically modified. The synthetic bead can be made of glass having a coating or polysiloxane. The synthetic beads can be placed in flotation cell containing a mixture of water, collector molecules, valuable material and unwanted material or in a pipeline where the mixture is transported from one location to another. The collector chemical can be xanthates. The enriched synthetic beads carrying the mineral particles are separated from the unwanted materials in the mixture. The mineral particles are then released from the synthetic beads by means of low pH treatment, ultrasonic agitation, thermal or electromagnetic treatment.

42 Claims, 16 Drawing Sheets

(56) References Cited

U.S. PATENT DOCUMENTS

| | | | |
|---|---|---|---|
| 4,685,963 A | 8/1987 | Saville | |
| 4,888,106 A | 12/1989 | Lipp et al. | |
| 4,971,685 A | 11/1990 | Stanley et al. | |
| 4,981,582 A | 1/1991 | Yoon et al. | |
| 5,161,694 A | 11/1992 | Yoon et al. | |
| 5,192,423 A | 3/1993 | Duczmal et al. | |
| 5,603,841 A | 2/1997 | Kerr | |
| 5,670,056 A | 9/1997 | Yoon et al. | |
| 5,965,117 A | 10/1999 | Howard, Jr. et al. | |
| 6,234,318 B1 | 5/2001 | Breau et al. | |
| 6,312,603 B1 | 11/2001 | Nishizawa | |
| 6,319,407 B1 | 11/2001 | Maatta et al. | |
| 6,799,682 B1 | 10/2004 | Yoon | |
| 6,871,743 B2 | 3/2005 | Yoon | |
| 6,890,431 B1 * | 5/2005 | Eades et al. | 210/195.1 |
| 7,264,728 B2 | 9/2007 | Gibson et al. | |
| 7,641,863 B2 | 1/2010 | Doktycz et al. | |
| 7,891,213 B2 | 2/2011 | Bogdahn et al. | |
| 8,007,754 B2 | 8/2011 | Yoon et al. | |
| 2003/0104359 A1 | 6/2003 | Cuthbertson et al. | |
| 2003/0225231 A1 | 12/2003 | Hall | |
| 2004/0000523 A1 | 1/2004 | Rosenberg et al. | |
| 2004/0173506 A1 | 9/2004 | Doktycz et al. | |
| 2005/0029204 A1 | 2/2005 | Schwartzkopf | |
| 2005/0139551 A1 | 6/2005 | Yoon | |
| 2005/0155415 A1 | 7/2005 | Kurowski et al. | |
| 2006/0113259 A1 | 6/2006 | Brunone | |
| 2006/0226051 A1 | 10/2006 | Navarrette et al. | |
| 2006/0263516 A1 | 11/2006 | Jones et al. | |
| 2006/0283516 A1 * | 12/2006 | Nagaoka et al. | 140/119 |
| 2008/0290029 A1 | 11/2008 | Crou et al. | |
| 2009/0061226 A1 | 3/2009 | Banin et al. | |
| 2009/0173668 A1 | 7/2009 | Duyvesteyn et al. | |
| 2009/0206040 A1 | 8/2009 | Berg et al. | |
| 2009/0267275 A1 * | 10/2009 | Birken | 266/168 |
| 2009/0301972 A1 | 12/2009 | Hines et al. | |
| 2010/0059449 A1 * | 3/2010 | Grass et al. | 210/695 |
| 2010/0072110 A1 | 3/2010 | Gradek | |
| 2010/0200510 A1 * | 8/2010 | Domke et al. | 210/679 |
| 2010/0279322 A1 | 11/2010 | Tang et al. | |
| 2010/0294725 A1 | 11/2010 | Bush et al. | |
| 2010/0300941 A1 | 12/2010 | Domke et al. | |
| 2011/0114566 A1 | 5/2011 | McCaw et al. | |
| 2012/0029120 A1 | 2/2012 | Soane et al. | |
| 2012/0076694 A1 | 3/2012 | Morozov et al. | |
| 2012/0091000 A1 | 4/2012 | Taylor et al. | |

OTHER PUBLICATIONS

Brown et al. Magnetic Control over Liquid Surface Properties with Responsive Surfactants. Angew. Chem. Int. Ed. 51: 1-4, 2012 (retrieved on Apr. 6, 2013). Retrieved from the Internet. <URL: http://www.magneticmicrosphere.com/ckfinder/userfiles/files/Brown_magnetic_detergent_2012.pdf>. entire document.

"The process of separation of fine mineral particles by flotation with hydrophobic polymeric carrier" by Jorge Rubio et al, International Journal of Mineral Processing, vol. 37, No. 1-2, Jan. 1, 1993, pp. 109-122.

* cited by examiner

Sized-Based Beads and Bubbles

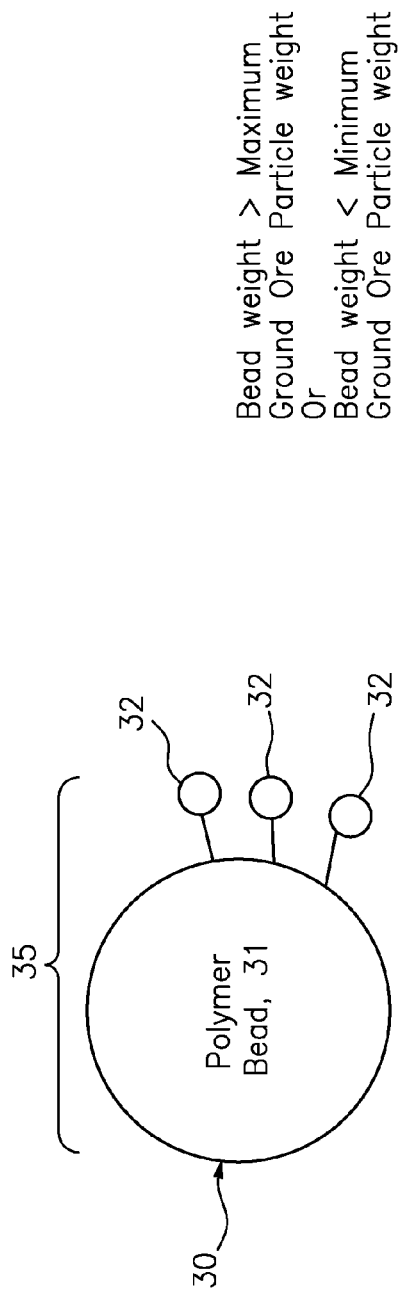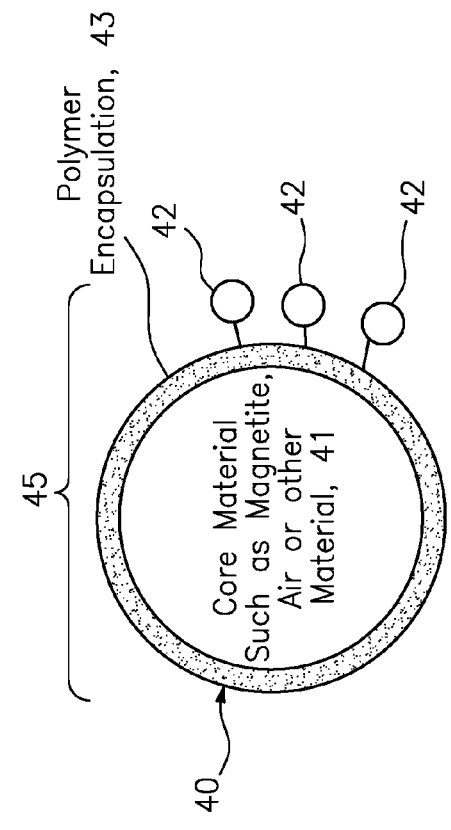
FIG. 3
FIG. 4
Weight-Based Beads and Bubbles

Magnetic-Based Beads and Bubbles

FIG. 12: Alternative Flotation Cell or Column

FIG. 13: Separation of Sized-Based bubbles or beads Using Countercurrent flows with Mixing

SYNTHETIC BUBBLES OR BEADS HAVING HYDROPHOBIC SURFACE

CROSS-REFERENCE TO RELATED APPLICATIONS

The present application corresponds to international patent application serial no. PCT/US2012/039596, filed 25 May 2012, which claims the benefit of U.S. Provisional Patent Application No. 61/489,893, filed 25 May 2011, and U.S. Provisional Patent Application No. 61/533,544, filed 12 Sep. 2011, which are both incorporated by reference in their entirety.

This application is also related to the following eight PCT applications, which are all concurrently filed on 25 May 2012, which all claim the benefit of the aforementioned U.S. Provisional Patent Application No. 61/489,893, filed 25 May 2011, and the aforementioned U.S. Provisional Patent Application No. 61/533,544, filed 12 Sep. 2011, and which are all incorporated by reference in their entirety so as to include the subject matter of each other, as follows:
- PCT application no. PCT/US12/39528, entitled "Flotation separation using lightweight synthetic bubbles and beads;"
- PCT application no. PCT/US12/39524, entitled "Mineral separation using functionalized polymer membranes;"
- PCT application no. PCT/US12/39540, entitled "Mineral separation using sized, weighted and magnetized beads;"
- PCT application no. PCT/US12/39576, entitled "Synthetic bubbles/beads functionalized with molecules for attracting or attaching to mineral particles of interest;"
- PCT application no. PCT/US12/39591, entitled "Method and system for releasing mineral from synthetic bubbles and beads;"
- PCT application no. PCT/US12/39631, entitled "Mineral separation using functionalized filters and membranes;"
- PCT application no. PCT/US12/39655, entitled "Mineral recovery in tailings using functionalized polymers;" and
- PCT application no. PCT/US12/39658, entitled "Techniques for transporting synthetic beads or bubbles In a flotation cell or column."

BACKGROUND OF THE INVENTION

1. Technical Field

This invention relates generally to a method and apparatus for separating valuable material from unwanted material in a mixture, such as a pulp slurry.

2. Background of the Invention

In many industrial processes, flotation is used to separate valuable or desired material from unwanted material. By way of example, in this process a mixture of water, valuable material, unwanted material, chemicals and air is placed into a flotation cell. The chemicals are used to make the desired material hydrophobic and the air is used to carry the material to the surface of the flotation cell. When the hydrophobic material and the air bubbles collide they become attached to each other. The bubble rises to the surface carrying the desired material with it.

The performance of the flotation cell is dependent on the air bubble surface area flux in the collection zone of the cell. The air bubble surface area flux is dependent on the size of the bubbles and the air injection rate. Controlling the air bubble surface area flux and air bubble size distribution has traditionally been very difficult. This is a multivariable control problem and there are no dependable real time feedback mechanisms to use for control.

There is a need in the industry to provide a better way to separate valuable material from unwanted material, e.g., including in such a flotation cell, so as to eliminate problems associated with using air bubbles in such a separation process.

SUMMARY OF THE INVENTION

The present invention provides new and unique mineral separation techniques using polymer bubbles or beads with controlled size, density or magnetic properties. According to some embodiments of the present invention, the surface of the bubbles or beads is functionalized to be hydrophobic so as to provide a bonding between the surface and a mineral particle that is hydrophobic or that has been functionalized to be hydrophobic through association with one or more collector molecules. The term "bonding" when used in relation to two hydrophobic articles, such as the surface of the polymer bubbles or beads and the mineral particle, is intended to refer to the situation of when two hydrophobic articles come together in an aqueous solution to reduce the exposed hydrophobic surface area. This new state is at a lower energy state than when the two articles are separated within the aqueous solution. The action of the hydrophobic effect originate from the disruption of highly dynamic hydrogen bonds between molecules of liquid water for example by the non-polar solute. A hydrocarbon chain or a similar non-polar region or a big molecule is incapable of forming hydrogen bonds with water, and introduction of such a non-hydrogen bonding surface into water causes disruption of the hydrogen bonding network between water molecules. The hydrogen bonds are reoriented tangential to such a surface to minimize disruption of the hydrogen bonded 3D network of water molecules, thus leading to a structured water "cage" around the non-polar surface. The water molecules that form the "cage" (or solvation shell) have restricted mobilities. Additionally, as used herein, the hydrophobic effect can be said to cause two hydrophobic articles to "attract" and/or "attach" to one another. The bubbles or beads having a hydrophobic surface are referred herein as synthetic bubbles or beads. The term "polymer" in this specification means a large molecule made of many units of the same or similar structure linked together. Furthermore, the polymer can be naturally hydrophobic or functionalized to be hydrophobic.

Therefore, the terms "polymer bubbles or beads" and "synthetic bubbles or beads" are used interchangeably. Some polymers having a long hydrocarbon chain or silicon-oxygen backbone, for example, tend to be hydrophobic. Hydrophobic polymers include, but are not limited to, polystyrene, poly(d, l-lactide), poly(dimethylsiloxane), polypropylene, polyacrylic, polyethylene, etc. The mineral particle or the valuable material associated with one or more amphiphilic collector molecules is referred to as a wetted mineral particle. When the pulp slurry contains a plurality of collectors or collector molecules, some of the mineral particles will become wetted mineral particles if the collectors are attached to mineral particles, thus making the surface of the mineral particles hydrophobic. Xanthates can be used in the pulp slurry as the collectors. The bubbles or beads can be made of glass to be coated with hydrophobic silicone polymer including polysiloxanates so that the bubbles or beads become hydrophobic. The bubbles or beads can be made of metal to be coated with silicone alkyd copolymer, for example, so as to render the bubbles or beads hydrophobic. The bubbles or beads can be made of ceramic to be coated with fluoroalkylsilane, for example, so as to render the bubbles and hydrophobic. The bubbles or beads can be made of hydrophobic polymers, such as polystyrene and polypropylene to provide a hydrophobic surface. The bubbles or beads can be made of a polymer that is functionalized to be hydrophobic, at least on its surface, or through the entire polymer structure.

The Apparatus

According to some embodiments, the present invention may takes the form of apparatus such as a synthetic bead that features a solid-phase body comprising a surface; and a synthetic material provided on the surface, the synthetic material comprises a plurality of molecules configured to render the surface hydrophobic, and the molecules also being configured to attract to the surface solid hydrophobic particles having mineral particles with hydrophobic elements attached thereon contained in an aqueous mixture.

According to some embodiments of the present invention, the synthetic material may include a siloxane derivative, or polysiloxanates, or hydroxyl-terminated polydimethylsiloxanes.

According to some embodiments of the present invention, the solid-phase body may include an outer part made of some combination of glass, metal or polymer for providing the surface.

According to some embodiments of the present invention, the synthetic material selected from a group consisting of polystyrene, poly(d,l-lactide), poly(dimethylsiloxane), polypropylene, polyacrylic, polyethylene, hydrophobically-modified ethyl hydroxyethyl cellulose polysiloxanates, alkylsilane and fluoroalkylsilane. The list, however, is not necessarily exhaustive.

According to some embodiments of the present invention, the solid-phase body may be configured to be magnetic, or para-, ferri- or ferro-magnetic.

According to some embodiments of the present invention, the synthetic bead may be configured to have a different density than the aqueous mixture so as to float or sink therein.

According to some embodiments of the present invention, the synthetic bead may be configured to have substantially the same density as the aqueous mixture so as to neither float nor sink therein.

According to some embodiments of the present invention, the surface may include physical structures configured to trap the mineral particles, e.g., like grooves or dents, or configured as hair-like structures.

According to some embodiments of the present invention, if the mineral particles have a maximum size, then the solid-phase body may be configured with a body size greater than the maximum size.

According to some embodiments of the present invention, if the mineral particles have a minimum size, then the solid-phase body may be configured with a body size smaller than the minimum size.

According to some embodiments of the present invention, the surface may be functionalized to be hydrophobic for attracting the mineral particles to the surface.

According to some embodiments of the present invention, the synthetic beads may be configured with a size substantially larger than the mineral particles, with one or more mineral particles capable of attaching to a bead. According further to the invention, the beads may also be configured to have positive buoyancy for applications related to flotation cells. According to a further embodiment of the invention, the bead may be configured to have neutral or negative buoyancy for selecting and separating the mineral particles.

According to some embodiments of the present invention, the synthetic beads may be configured with a size substantially smaller than the mineral particles, with one or more beads capable of attaching to a mineral particle. According further to the invention, the beads may also be configured to have positive buoyancy for applications related to flotation cells. According to a further embodiment of the invention, the bead may be configured to have neutral or negative buoyancy for selecting and separating the mineral particles.

According to some embodiments of the present invention, the synthetic beads may be configured with a size substantially larger than the mineral particles, with only a portion of the surface of the bead functionalized to be attractive to and attach to one or more mineral particles. According further to the invention, the beads may also be configured to have positive buoyancy for applications related to flotation cells. According to a further embodiment of the invention, the bead may be configured to have neutral or negative buoyancy for selecting and separating the mineral particles.

According to some embodiments of the present invention, the synthetic beads may be configured with a plurality of size distribution, with some sized substantially smaller than the mineral particles, some substantially the same size as the mineral particles, and some substantially larger than the mineral particles.

According to some embodiments of the present invention, the synthetic beads may be configured with a size less than 100 μm for attracting to mineral particles having a substantially similar size, including in applications related to flotation cells; or the synthetic beads may be configured with a size of about 100 μm for attracting to mineral particles having a substantially similar size; or the synthetic beads may be configured with a size in a range of about 100-200 μm for attracting to mineral particles having a substantially similar size; or the synthetic beads may be configured with a size about 200 μm for attracting to mineral particles having a substantially similar size; or the synthetic beads may be configured with a size in a range of about 1 mm to 10 mm, including in applications related to a tailings pond; or the synthetic beads may be configured with a size in a range of about 200 μm to 10 mm, including for other types or kinds of applications.

The Method

According to some embodiments, the present invention, the method may feature steps for receiving an aqueous mixture in a processor, the mixture comprising solid hydrophobic particles having mineral particles with hydrophobic elements attached thereon; causing a plurality of synthetic beads to contact with the aqueous mixture in the processor, where said synthetic bead comprises:
  a solid-phase body comprising a surface; and
  a synthetic material provided on the surface, the synthetic material comprising a plurality of molecules configured to render the surface hydrophobic, the molecules being configured to attract to the surface the solid hydrophobic particles in the aqueous mixture.

According to some embodiments of the present invention, the method may include one or more of the features set forth herein.

According to some embodiments of the present invention, the method may feature steps for arranging a plurality of synthetic beads to contact with an aqueous mixture comprising solid hydrophobic particles having mineral particles with hydrophobic elements attached thereon, said synthetic bead comprising: a solid-phase body comprising a surface, and a synthetic material provided on the surface, the synthetic material comprises a plurality of molecules configured to render the surface hydrophobic, the molecules also being configured to attract the solid hydrophobic particles to the surface; allowing the solid hydrophobic particles to attach to the synthetic beads for providing a plurality of enriched synthetic beads, the enriched synthetic beads comprising at least some of the solid hydrophobic particles attached to the surface of the synthetic beads; and releasing said some of the solid hydrophobic particles from the surface of the enriched synthetic beads.

According to some embodiments of the present invention, the method may include a step of releasing that includes washing the enriched synthetic beads with water so as to remove at least some of the solid hydrophobic particles from the surface. As the enriched synthetic beads are in the water, ultrasonic waves can also be applied to the enriched synthetic beads for removing the solid hydrophobic particles from surface.

According to some embodiments of the present invention, the method may include removing the enriched synthetic beads from the aqueous mixture.

According to some embodiments of the present invention, the method may include one or more of the features set forth herein.

A Hydrophobic Synthetic Structure

According to some embodiments of the present invention, the apparatus may take the form of a hydrophobic synthetic structure having a solid-phase body comprising a surface; and a synthetic material provided on the surface, the synthetic material comprises a plurality of molecules configured to render the surface hydrophobic, and the combination of the molecules and the surface being configured to attract and retain solid hydrophobic particles having mineral particles with hydrophobic elements attached thereon contained in an aqueous mixture.

According to some embodiments of the present invention, the synthetic material may be selected from the following group: a siloxane derivative, polysiloxanates or hydroxyl-terminated polydimethylsiloxanes.

According to some embodiments of the present invention, the hydrophobic synthetic structure may take the form of some combination of a mesh-like structure, a membrane-like structure, a grooved structure, a grate-like structure, a tubular structure, a hairy structure, a course structure, a smooth structure, a rectangular structure, a honeycomb-like structure, a solid bead, or a two-part bead structure with an inner core and an outer covering, and the surface having a corresponding structural characteristic based at least partly on the configuration of the corresponding structure.

The Separation Process

The present invention may also take the form of apparatus for use in, or forming part of, a separation process to be implemented in separation processor technology, the apparatus featuring synthetic bubbles or beads configured with a polymer or polymer-based material functionalized to be hydrophobic so as to attach to a wetted valuable material in a mixture to form an enriched synthetic bubbles or beads having the valuable material attached thereto, and also configured to be separated from the mixture based at least partly on a difference in a physical property between the enriched synthetic bubbles or beads having the valuable material attached thereto and the mixture.

The separation process may be implemented in separation processor technology which combines the synthetic bubbles or beads and the mixture, and which provides the enriched synthetic bubbles or beads having the valuable material attached thereto that are separated from the mixture based at least partly on the difference in the physical property between the enriched synthetic bubbles or beads having the valuable material attached thereto and the mixture.

Size-Based Separation

The separation process may be implemented using sized-based separation, where the synthetic bubbles or beads may be configured to be separated from the mixture based at least partly on the difference between the size of the enriched synthetic bubbles or beads having the valuable material attached thereto in relation to the size of unwanted material in the mixture.

According to some embodiments of the present invention, the synthetic bubbles or beads may be configured either so that the size of the synthetic bubbles or beads is greater than a maximum ground ore particle size in the mixture, or so that the size of the synthetic bubbles or beads is less than a minimum ground ore particle size in the mixture.

According to some embodiments of the present invention, the synthetic bubbles or beads may be configured as solid polymer bubbles or beads.

According to some embodiments of the present invention, the synthetic bubbles or beads may be configured with a core material of sand, silica or other suitable material and also configured with a polymer encapsulation.

Weight-Based Separation

The separation process may be implemented using weight-based separation, where the synthetic bubbles or beads are configured to be separated from the mixture based at least partly on the difference between the weight of the enriched synthetic bubbles or beads having the valuable material attached thereto in relation to the weight of unwanted material in the mixture.

According to some embodiments of the present invention, the synthetic bubbles or beads may be configured so that the weight of the synthetic bubbles or beads is greater than a maximum ground ore particle weight in the mixture, or so that the weight of the synthetic bubbles or beads is less than a minimum ground ore particle weight in the mixture.

According to some embodiments of the present invention, the synthetic bubbles or beads may be configured as solid polymer bubbles or beads.

According to some embodiments of the present invention, the synthetic bubbles or beads may be configured with a core material of magnetite, air or other suitable material and also configured with a polymer encapsulation.

Magnetic-Based Separation

The separation process may be implemented using magnetic-based separation, where the synthetic bubbles or beads may be configured to be separated from the mixture based at least partly on the difference between the para-, ferri-, ferro-magnetism of the enriched synthetic bubbles or beads having the valuable material attached thereto in relation to the para-, ferri, ferro-magnetism of unwanted material in the mixture.

According to some embodiments of the present invention, the synthetic bubbles or beads may be configured so that the para-, ferri-, ferro-magnetism of the synthetic bubbles or beads is greater than the para-, ferri-, ferro-magnetism of the unwanted ground ore particle in the mixture.

According to some embodiments of the present invention, the synthetic bubbles or beads may be configured with a ferro-magnetic or ferri-magnetic core that attract to paramagnetic surfaces and also configured with a polymer encapsulation.

Density-Based Separation

The separation process may be implemented using density-based separation, where the synthetic bubbles or beads may be configured to be separated from the mixture based at least partly on the difference between the density of the enriched synthetic bubbles or beads having the valuable material attached thereto and the density of the mixture, consistent with that disclosed in patent application serial no. PCT/US12/39528, filed 25 May 2011, which is hereby incorporated by reference in its entirety.

BRIEF DESCRIPTION OF THE DRAWING

Referring now to the drawing, which are not drawn to scale, the foregoing and other features and advantages of the present invention will be more fully understood from the following detailed description of illustrative embodiments, taken in conjunction with the accompanying drawing in which like elements are numbered alike:

FIGS. 1-6 show respectively sized-based beads and bubbles, weight-based polymer beads and bubbles, and magnetic-based beads and bubbles according to some embodiments of the present invention, including FIGS. 1 and 2 that respectively show a size-based solid polymer bead and bubble and a size-based bead and bubble having a core material and a polymer encapsulation; FIGS. 3 and 4 that respectively show a weight-based solid polymer bead and bubble and a weight-based bead and bubble having a core material and a polymer encapsulation; and FIGS. 5 and 6 that respectively show a magnetic-based bead and bubble having a ferro-, or ferri-, or para-magnetic core and a polymer encapsulation.

DETAILED DESCRIPTION OF THE INVENTION

Figure 1:
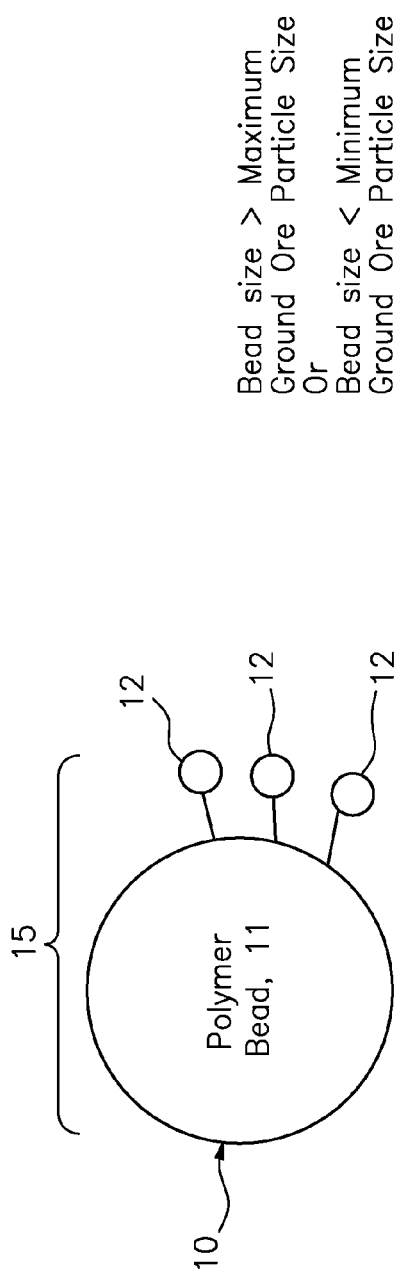

According to some embodiments of the present invention, at least the surface of the synthetic bubbles or beads is functionalized so that the surface is hydrophobic.

In chemistry, hydrophobicity is the physical property of a molecule (known as a hydrophobe) that is repelled from a mass of water. Hydrophobic molecules tend to be non-polar and, thus, prefer other neutral molecules and non-polar solvents. Hydrophobic molecules in water often cluster together. According to thermodynamics, matter seeks to be in a low-energy state, and bonding reduces chemical energy. Water is electrically polarized, and is able to form hydrogen bonds internally, which gives it many of its unique physical properties. But, since hydrophobes are not electrically polarized, and because they are unable to form hydrogen bonds, water repels hydrophobes, in favor of bonding with itself. It is this effect that causes the hydrophobic interaction.

The hydrophobic effect is the observed tendency of nonpolar substances to aggregate in aqueous solution and exclude water molecules. It can be observed as the segregation and apparent repulsion between water and non-polar substances. The hydrophobic interaction is mostly an entropic effect originating from the disruption of highly dynamic hydrogen bonds between molecules of liquid water by the non-polar solute. A hydrocarbon chain or a similar non-polar region or a big molecule is incapable of forming hydrogen bonds with water. The introduction of such a non-hydrogen bonding surface into water causes disruption of the hydrogen bonding network between water molecules. The hydrogen bonds are reoriented tangential to such a surface to minimize disruption of the hydrogen bonded 3D network of water molecules and thus leads to a structured water "cage" around the nonpolar surface. The water molecules that form the "cage" (or solvation shell) have restricted mobilities. For example, in the case of larger non-polar molecules the reorientational and translational motion of the water molecules in the solvation shell may be restricted by a factor of two to four. Generally, this leads to significant losses in translational and rotational entropy of water molecules and makes the process unfavorable in terms of free energy of the system. By aggregating together, nonpolar molecules reduce the surface area exposed to water and minimize their disruptive effect.

Froth flotation is a process for selectively separating hydrophobic materials from hydrophilic. The process has been adapted and applied to a wide variety of materials to be separated, and additional collector agents, including surfactants and synthetic compounds have been adopted for various applications.

In mining operations, froth flotation is a process for separating minerals from gangue by taking advantage of differences in their hydrophobicity. Hydrophobicity differences between valuable minerals and waste gangue are increased through the use of collectors and wetting agents. The selective separation of the minerals makes processing complex (that is, mixed) ores economically feasible. The flotation process is used for the separation of a large range of sulfides, carbonates and oxides prior to further refinement. Phosphates and coal are also upgraded (purified) by flotation technology. Froth flotation commences by comminution (that is, crushing and grinding), which is used to increase the surface area of the ore for subsequent processing. The ore include the desired minerals and other unwanted materials, know a gangue. The process of grinding the ore into a fine power is known as liberation. The fine powder ore is then mixed with water to form a slurry. The desired mineral is rendered hydrophobic by the addition of a surfactant or collector chemical. The particular chemical depends on which mineral is being refined. This slurry (more properly called the pulp) of hydrophobic mineral particles and hydrophilic gangue particles is then placed in a flotation column or horizontal pipeline wherein the concentrated mineral is separated from the tailings containing the gangue. To be effective on a given ore slurry, the collectors are chosen based upon their selective wetting of the types of particles to be separated. A good collector will adsorb, physically or chemically, with one of the types of particles. In a flotation circuit for mineral concentration, various flotation reagents are added to a mixture of ore and water (called pulp) in a conditioning tank. The flow rate and tank size are designed to give the minerals enough time to be activated. The conditioner pulp is fed to a bank of rougher cells which remove most of the desired minerals as a concentrate. The rougher pulp passes to a bank of scavenger cells where additional reagents may be added. The scavenger cell froth is usually returned to the rougher cells for additional treatment, but in some cases may be sent to special cleaner cells. The scavenger pulp is usually barren enough to be discarded as tails. More complex flotation circuits have several sets of cleaner and re-cleaner cells, and intermediate re-grinding of pulp or concentrate. Because of a number of other factors, as much as 15% of the liberated minerals are not recovered and are discarded as gangue

Collectors

Collectors either chemically bond (chemisorption) on a hydrophobic mineral surface, or adsorb onto the surface in the case of, for example, coal flotation through physisorption. Collectors increase the natural hydrophobicity of the surface, increasing the separability of the hydrophobic and hydrophilic particles.

Figure 5:
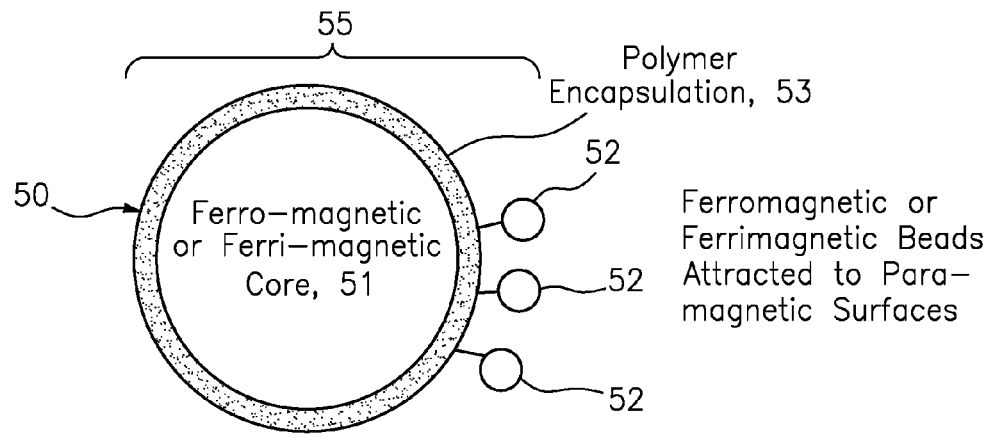
Figure 6:
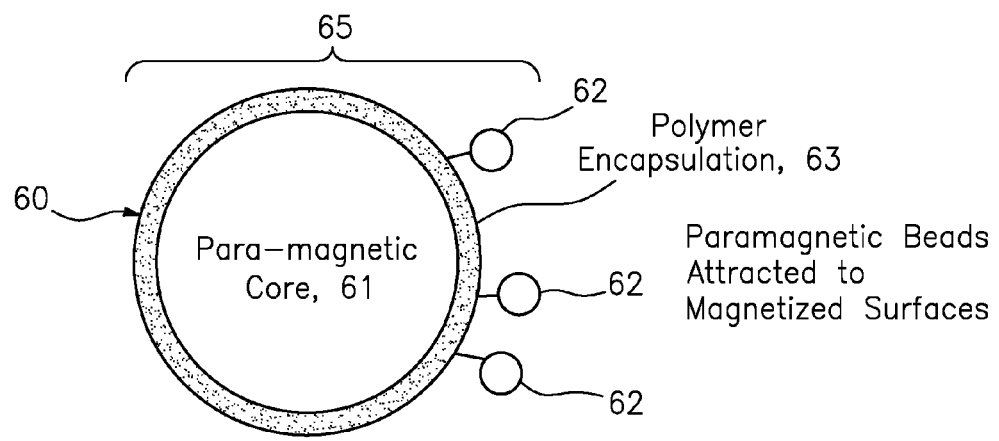

FIGS. 1-6 show the present invention in the form of apparatus or material for use in, or forming part of, a separation process to be implemented in separation processor technology, the apparatus featuring synthetic bubbles or beads indicated by arrows 10 (FIG. 1), 20 (FIG. 2), 30 (FIG. 3), 40 (FIG. 4), 50 (FIG. 5), 60 (FIG. 6), configured with a polymer or polymer-based material 11 (FIG. 1), 21 (FIG. 2), 31 (FIG. 3), 41 (FIG. 4), 51 (FIG. 5), 61 (FIG. 6) functionalized to be hydrophobic or being naturally hydrophobic so as to attach to a valuable material 12 (FIG. 1), 22 (FIG. 2), 32 (FIG. 3), 42 (FIG. 4), 52 (FIG. 5), 62 (FIG. 6) in a mixture so as to form an enriched synthetic bubble or bead generally indicated as 15 (FIG. 1), 25 (FIG. 2), 35 (FIG. 3), 45 (FIG. 3), 55 (FIG. 5), 65 (FIG. 6) having the valuable material 12 (FIG. 1), 22 (FIG. 2), 32 (FIG. 3), 42 (FIG. 4), 52 (FIG. 5), 62 (FIG. 6) attached thereto, consistent with that disclosed herein, and also configured to be separated from the mixture based at least partly on a difference in a physical property between the enriched synthetic bubbles or beads 15 (FIG. 1), 25 (FIG. 2), 35 (FIG. 3), 45 (FIG. 3), 55 (FIG. 5), 65 (FIG. 6) having the valuable material 12 (FIG. 1), 22 (FIG. 2), 32 (FIG. 3), 42 (FIG. 4), 52 (FIG. 5), 62 (FIG. 6) attached thereto. The mixture can be a pulp slurry, for example. The valuable material 12 (FIG. 1), 22 (FIG. 2), 32 (FIG. 3), 42 (FIG. 4), 52 (FIG. 5), 62 (FIG. 6) is wetted in that it has a hydrophobic molecule or molecular segment attached to the hydrophobic surface of the valuable mineral to be attracted to the surface of the synthetic bubbles or beads 10 (FIG. 1), 20 (FIG. 2), 30 (FIG. 3), 40 (FIG. 4), 50 (FIG. 5), 60 (FIG. 6).

Figure 2:
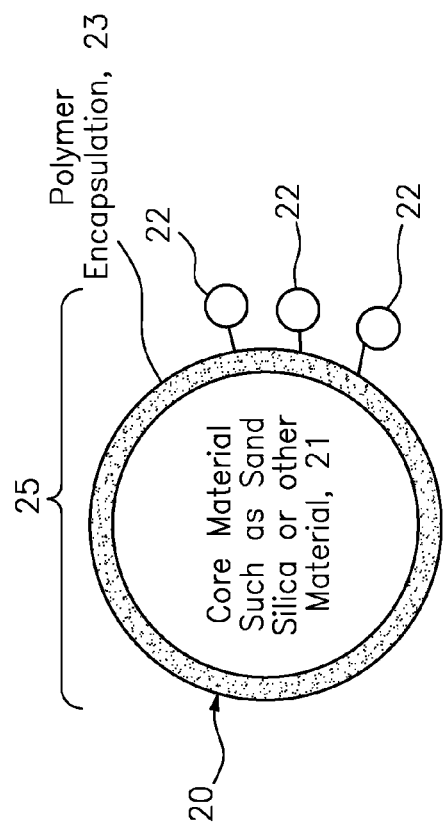

In FIG. 1, the synthetic bubble or bead 10 is a size-based solid polymer bead and bubble 11 functionalized to attach to the valuable material 12 of interest in the mixture and to be separated from the mixture based on size. In FIG. 2, the synthetic bubble or bead 20 is a size-based bead and bubble 20 having a core material 21 and a polymer encapsulation 23 functionalized to attach to the valuable material 22 of interest in the mixture and to be separated from the mixture based on size. By way of example, the core material 21 may include materials such as sand, silica or other suitable material either now known or later developed in the future.

Polymers or polymer-based materials that may be functionalized to attach to such a valuable material, such as valuable material 12 (FIG. 1), 22 (FIG. 2), 32 (FIG. 3), 42 (FIG. 4), 52 (FIG. 5), 62 (FIG. 6), of interest, such as copper, gold, nickel, lead or other mineral are known in the art, and the scope of the invention is not intended to be limited to any particular type or kind thereof. Embodiments are envisioned using polymers or polymer-based materials now known and later developed in the future. It should be noted that the bubbles or beads are referred herein as synthetic bubbles or beads. The term "polymer" in this specification means a large molecule made of many units of the same or similar structure linked together. The unit can be a monomer or an oligomer which forms the basis of, for example, polyamides (nylon), polyesters, polyurethanes, phenol-formaldehyde, urea-formaldehyde, melamine-formaldehyde, polyacetal, polyethylene, polyisobutylene, polyacrylonitrile, poly(vinyl chloride), polystyrene, poly(methyl methacrylates), poly(vinyl acetate), poly(vinylidene chloride), polyisoprene, polybutadiene, polyacrylates, poly(carbonate), phenolic resin, polydimethylsiloxane and other organic or inorganic polymers. The list here is not necessarily exhaustive. Thus, the synthetic material can be hard or rigid like plastic or soft and flexible like an elastomer. While the physical properties of the synthetic beads can vary, the surface of the synthetic beads is chemically functionalized to provide a plurality of functional groups to attract mineral particles.

According to the present invention, the synthetic bubbles or beads 10 or 20 in FIGS. 1 and 2 may be configured to be separated from the mixture based at least partly on the difference between the size of the enriched synthetic bubbles or beads having the valuable material 12, 22 attached thereto in relation to the size of unwanted material in the mixture. For example, the synthetic bubble or bead 10 or 20 may be configured either so that the size of the synthetic bubbles or beads 10 or 20 is greater than a maximum ground ore particle size in the mixture, or so that the size of the synthetic bubbles or beads 10 or 20 is less than a minimum ground ore particle size in the mixture. When the particle size is large, a small bubble or bead may not be able to lift the valuable material upward. When the particle size is small, the flow around a large bubble or bead may cause the valuable material to move away from the bubble or bead. Thus, it would be more efficient to use smaller bubbles or beads to collect the valuable material in a small ground.

In FIG. 3, the synthetic bubble or bead 30 is a weight-based solid polymer bead and bubble 31 functionalized to attach to the valuable material 32 of interest in the mixture and to be separated from the mixture based on weight. In FIG. 4, the synthetic bubbles or beads 40 is a weight-based bead and bubble 40 having a core material 41 and a polymer encapsulation 43 functionalized to attach to the valuable material 42 of interest in the mixture and to be separated from the mixture based on weight. The core material 41 may be made of materials such as magnetite, air or other suitable material and also configured with a polymer encapsulation.

According to the present invention, the synthetic bubbles or beads 30, 40 may be configured to be separated from the mixture based at least partly on the difference between the weight of the enriched synthetic bubbles or beads having the valuable material attached thereto in relation to the weight of unwanted material in the mixture. For example, the synthetic bubbles or beads 30, 40 may be configured so that the weight of the synthetic bubbles or beads is greater than a maximum ground ore particle weight in the mixture, or so that the weight of the synthetic bubbles or beads is less than a minimum ground ore particle weight in the mixture.

In FIG. 5, the synthetic bead or bubble 50 is shown as a magnetic-based bead and bubble having a ferro- or ferri-magnetic core 51 and a polymer encapsulation 53, such that the ferro-magnetic or ferri-magnetic core 51 attracts to paramagnetic surfaces. In FIG. 6, the synthetic bead or bubble is shown as a magnetic-based bead and bubble having a paramagnetic core 61 and a polymer encapsulation 63, such that the para-magnetic core attracts to magnetized surfaces.

According to the present invention, the synthetic bubbles or beads 50, 60 may be configured to be separated from the mixture based at least partly on the difference between the para-, ferri-, ferro-magnetism of the enriched synthetic bubbles or beads having the valuable material 52, 62 attached thereto in relation to the para-, ferri-, ferro-magnetism of unwanted material in the mixture.

Figure 7B:
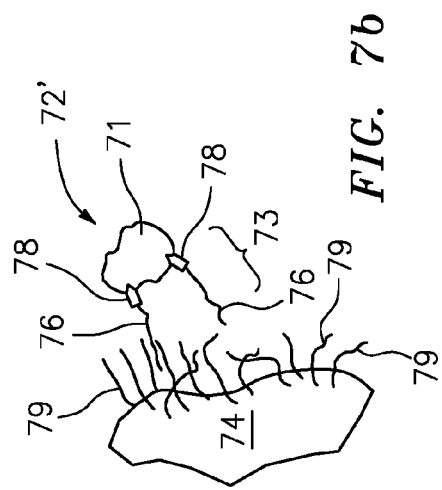
FIG. 7b illustrates an enlarged portion of the synthetic bead showing a wetted mineral particle attached to the hydrophobic surface of the synthetic bead, according to some embodiments of the present invention.
Figure 7C:
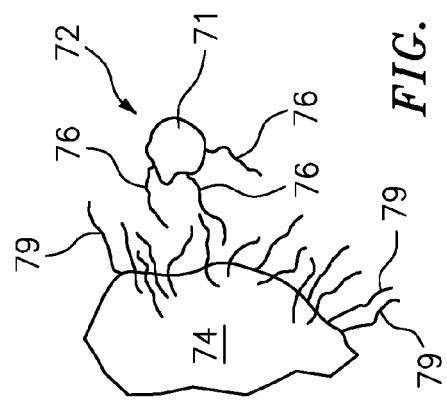
FIG. 7c illustrates an enlarged portion of the synthetic bead showing a hydrophobic particle attached to the hydrophobic surface of the synthetic bead, according to some embodiments of the present invention.
Figure 7A:
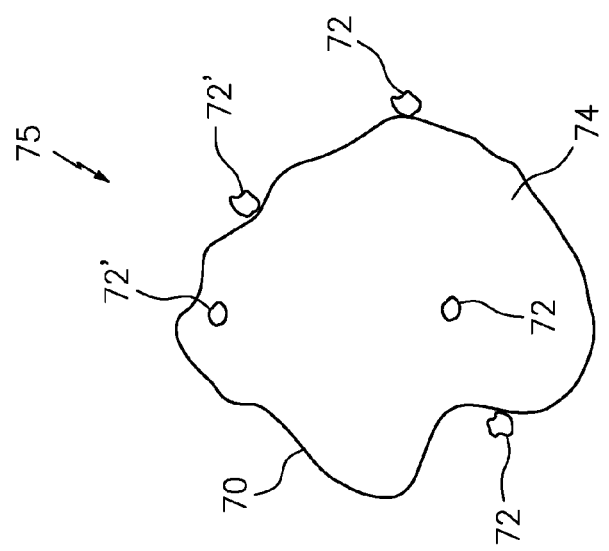
FIG. 7a shows a generalized synthetic bubble or bead which can be a size-based bead or bubble, weight-based polymer beads and bubbles, and magnetic-based beads and bubbles, having some particles attached to the surface, according to some embodiments of the present invention.

For aiding a person of ordinary skill in the art in understanding various embodiments of the present invention, FIG. 7a shows a generalized synthetic bubble or bead which can be a size-based bead or bubble, weight-based polymer beads and bubbles, and magnetic-based beads and bubbles, having some particles attached to the surface. FIG. 7b illustrates an enlarged portion of the synthetic bead showing a wetted mineral particle attached to the hydrophobic surface of the synthetic bead. FIG. 7c illustrates an enlarged portion of the synthetic bead showing a hydrophobic particle attached to the hydrophobic surface of the synthetic bead. The hydrophobic particle can be mineral related or non-mineral related. The synthetic bead can be a size-based bead or bubble, weight-based polymer bead and bubble, and magnetic-based bead and bubble as described in conjunction with FIGS. 1 to 6. The size of the synthetic bead can be smaller than the minimum size of the mineral particles which is about 150 μm, and can be larger than the maximum size of the mineral particles. In certain applications, the size of the synthetic bead can be 1 cm or larger.

As shown in FIG. 7a, the synthetic bubble or bead 70 has a bead body to provide a bead surface 74. At least the outside part of the bead body is made of a synthetic material, such as a hydrophobic polymer, or a coating of a hydrophobic chemical. As such, hydrophobic particles 72, 72' are attracted to the surface 74 to form an enriched synthetic bubble or bead 75. As shown in FIGS. 7a and 7b, the surface 74 of the synthetic bubble or bead comprises a plurality of molecules 79 which renders the surface 74 hydrophobic. For example, the surface 74 may be a glass surface coated with polysiloxanates which have functional groups that bind to the hydroxyl group of the glass surface. Polysiloxanates, such as hydroxyl-terminated polydimethysiloxanes, have a silicon-oxygen chain to provide the hydrophobic molecules 79. The hydrophobic particle 72', as shown in FIG. 7b, can be a mineral particle 71' having one or more collectors 73 attached thereto. One end (78) of the collector 73 has an ion or charge species for bonding to the mineral particle 71'. The other end of the collector 73 has a hydrophobic chain 76 which tends to move into the hydrophobic molecules 79 through the action of hydrophobic effect, as described herein. Thus, the hydrophobic particle 72' can be a wetted mineral particle. A collector, such as xanthate, has both the functional group 78 and the molecule 76. A xanthate, for example, has both the functional group 78 and the molecular segment 76 to be incorporated into the polymer that is used to make the synthetic bead 70. A functional group 78 is also known as a collector that is either ionic or non-ionic. The ion can be anionic or cationic. An anion includes oxyhydryl, such as carboxylic, sulfates and sulfonates, and sulfhydral, such as xanthates and dithiophosphates. Other molecules or compounds that can be used to provide the function group 78 include, but are not limited to, thionocarboamates, thioureas, xanthogens, monothiophosphates, hydroquinones and polyamines.

The hydrophobic particle 72, as shown in FIG. 7c, can be a particle that has a hydrophobic chain 76. Such particle can be non-mineral related, but it can be arranged to contact with the hydrophobic synthetic bubbles or beads 70 of the present inventions. Thus the hydrophobic bubbles or beads 70, according to some embodiments of the present invention, can be used in non-mining applications, such as water-pollution control.

Figure 8A:
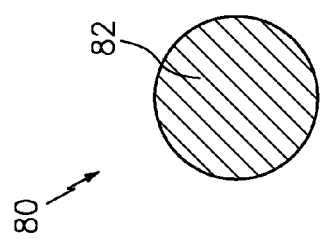
FIG. 8a illustrates a synthetic bead having a body made of a synthetic material, according to some embodiments of the present invention.
Figure 8B:
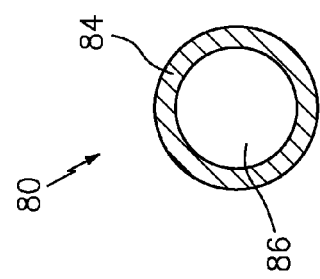
FIG. 8b illustrates a synthetic bead with a synthetic shell, according to some embodiments of the present invention.

In some embodiments of the present invention, a synthetic bead has a solid-phase body made of a synthetic material, such as polymer. The polymer can be rigid or elastomeric. An elastomeric polymer can be polyisoprene, polybutadiene or natural rubber based polymer, for example. The body has a surface comprising a plurality of molecules rendering the surface hydrophobic for attracting wetted mineral particles to the surface. A polymer having hydrophobic molecules attached thereto is referred to as a functionalized polymer. In one embodiment, the entire body 82 of the synthetic bead 80 is made of the same functionalized material, as shown in FIG. 8a. In another embodiment, the bead body is a shell, as shown in FIG. 8b. The shell 84 can be formed by way of expansion, such as thermal expansion or pressure reduction.

Figure 8C:
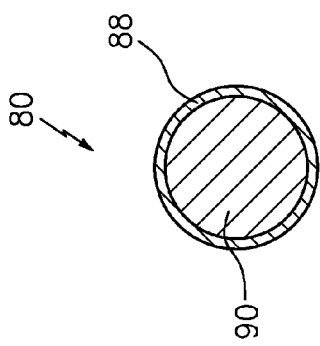
FIG. 8c illustrates a synthetic bead with a synthetic coating, according to some embodiments of the present invention.
Figure 8D:
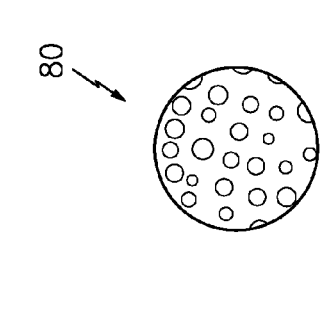
FIG. 8d illustrates a synthetic bead taking the form of a porous block, a sponge or foam.

The shell 84 can be a micro-bubble or a balloon. In FIG. 8b, the shell 84, which is made of functionalized material, has an interior part 86. The interior part 86 can be filled with air or gas to aid buoyancy, for example. The interior part 86 can be used to contain a liquid to be released during the mineral separation process. The encapsulated liquid can be a polar liquid or a non-polar liquid, for example. The encapsulated liquid can contain a depressant composition for the enhanced separation of copper, nickel, zinc, lead in sulfide ores in the flotation stage, for example. The shell 84 can be used to encapsulate a powder which can have a magnetic property so as to cause the synthetic bead to be magnetic, for example. The shell 84 can be used to encapsulate a solid core, such as Styrofoam to aid buoyancy, for example. In yet another embodiment, only the coating of the bead body is made of functionalized polymer. As shown in FIG. 8c, the synthetic bead has a core 90 made of ceramic, glass or metal and only the surface of core 90 has a coating 88 of the functionalized polymer, such as a hydrophobic-modified polymer or polysiloxane. The core 90 can be a hollow core or a filled core depending on the application. The core 90 can be a micro-bubble, a sphere or balloon. For example, a filled core made of metal makes the density of the synthetic bead to be higher than the density of the pulp slurry, for example. The core 90 can be made of a magnetic material so that the para-, ferri-, ferro-magnetism of the synthetic bead is greater than the para-, ferri-, ferro-magnetism of the unwanted ground ore particle in the mixture. In a different embodiment, the synthetic bead can be configured with a ferro-magnetic or ferrimagnetic core that attract to paramagnetic surfaces. A core 90 made of glass or ceramic can be used to make the density of the synthetic bead substantially equal to the density of the pulp slurry so that when the synthetic beads are mixed into the pulp slurry for mineral collection, the beads can be in a suspension state.

Figure 9A:
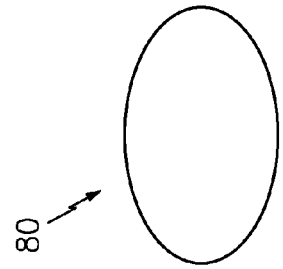
FIG. 9a illustrates a synthetic bead having an elliptical shape, according to some embodiments of the present invention.
Figure 9B:
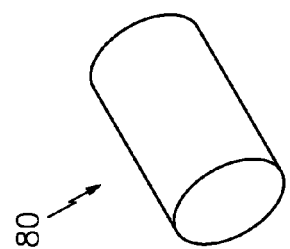
FIG. 9b illustrates a synthetic bead having a cylindrical shape, according to some embodiments of the present invention.
Figure 9C:
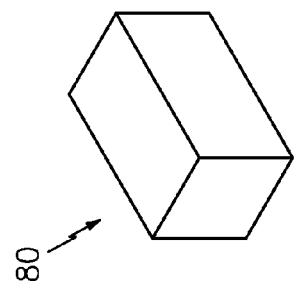
FIG. 9c illustrates a synthetic bead having a shape of a block, according to some embodiments of the present invention.
Figure 9D:
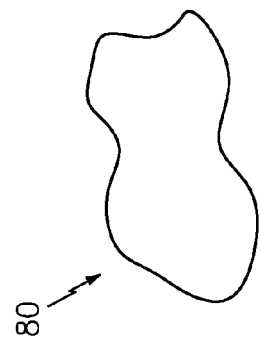
FIG. 9d illustrates a synthetic bead having an irregular shape, according to some embodiments of the present invention.

It should be understood that the term "bead" may indicate a spherical shape but does not limit the shape of the synthetic bead of the present invention to be spherical. In some embodiments of the present invention, the synthetic bead 80 can have an elliptical shape as shown in FIG. 9a. The synthetic bead can have a cylindrical shape as shown in FIG. 9b. The synthetic bead can have a shape of a block as shown in FIG. 9c. Furthermore, the synthetic bead can have an irregular shape, as shown in FIG. 9d.

Figure 10C:
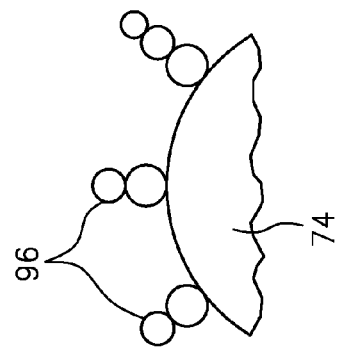
FIG. 10c illustrates the surface of a synthetic bead with stacked beads, according to some embodiments of the present invention.
Figure 10B:
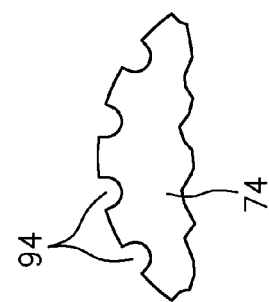
FIG. 10b illustrates the surface of a synthetic bead with dents or holes, according to some embodiments of the present invention.
Figure 10A:
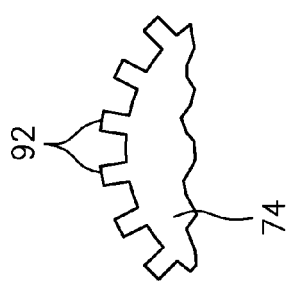
FIG. 10a illustrates the surface of a synthetic bead with grooves or rods, according to some embodiments of the present invention.
Figure 10D:
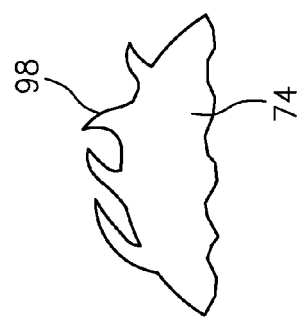
FIG. 10d illustrates the surface of a synthetic bead with hair-like physical structures, according to some embodiments of the present invention.

It should also be understood that the surface of a synthetic bead, according to the present invention, is not limited to an overall smooth surface as shown in FIG. 7a. In some embodiments of the present invention, the surface can be irregular and rough. For example, the surface 74 can have some physical structures 92 like grooves or rods as shown in FIG. 10a. The surface 74 can have some physical structures 94 like holes or dents as shown in FIG. 10b. The surface 74 can have some physical structures 96 formed from stacked beads as shown in FIG. 10c. The surface 74 can have some hair-like physical structures 98 as shown in FIG. 10d. In addition to the hydrophobicity on the synthetic beads that attract wetted mineral particles to the bead surface, the physical structures can help trapping the mineral particles on the bead surface. The surface 74 can be configured to be a honeycomb surface or a sponge-like surface for trapping the wetted mineral particles and/or increasing the contacting surface.

It should be noted that the synthetic beads of the present invention can be realized by different ways to achieve the same goal. Namely, it is possible to use a different means to attract the wetted mineral particles to the surface of the synthetic beads. For example, the surface of the polymer beads, shells can be made of a hydrophobic polymer or coated with hydrophobic gels or sprays. The surface of beads made of glass, ceramic and metal can be coated with hydrophobic chemical molecules or compounds. Using the coating of glass beads as an example, polysiloxanates can be used to functionalize the glass beads in order to make the synthetic beads. In the pulp slurry, xanthate and hydroxamate collectors can also be added therein for collecting the mineral particles and making the mineral particles hydrophobic. When the synthetic beads are used to collect the mineral particles in the pulp slurry having a pH value around 8-9, it is possible to release the mineral particles on the enriched synthetic beads from the surface of the synthetic beads in an acidic solution, such as a sulfuric acid solution. It is also possible to release the mineral particles carrying with the enriched synthetic beads by sonic agitation, such as ultrasonic waves.

Figure 11:
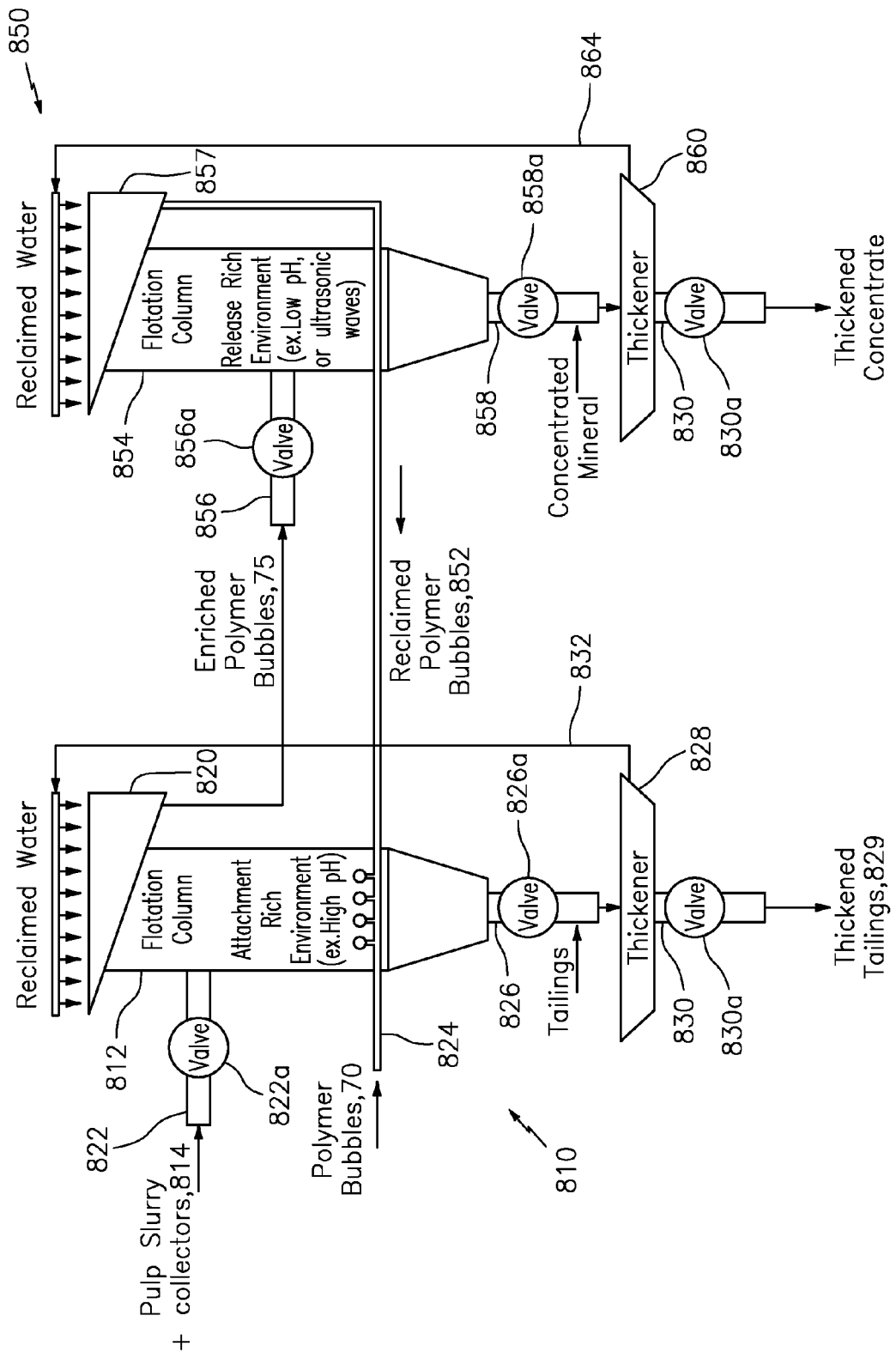
FIG. 11 is a diagram of a flotation system, process or apparatus according to some embodiments of the present invention.
Figure 12:
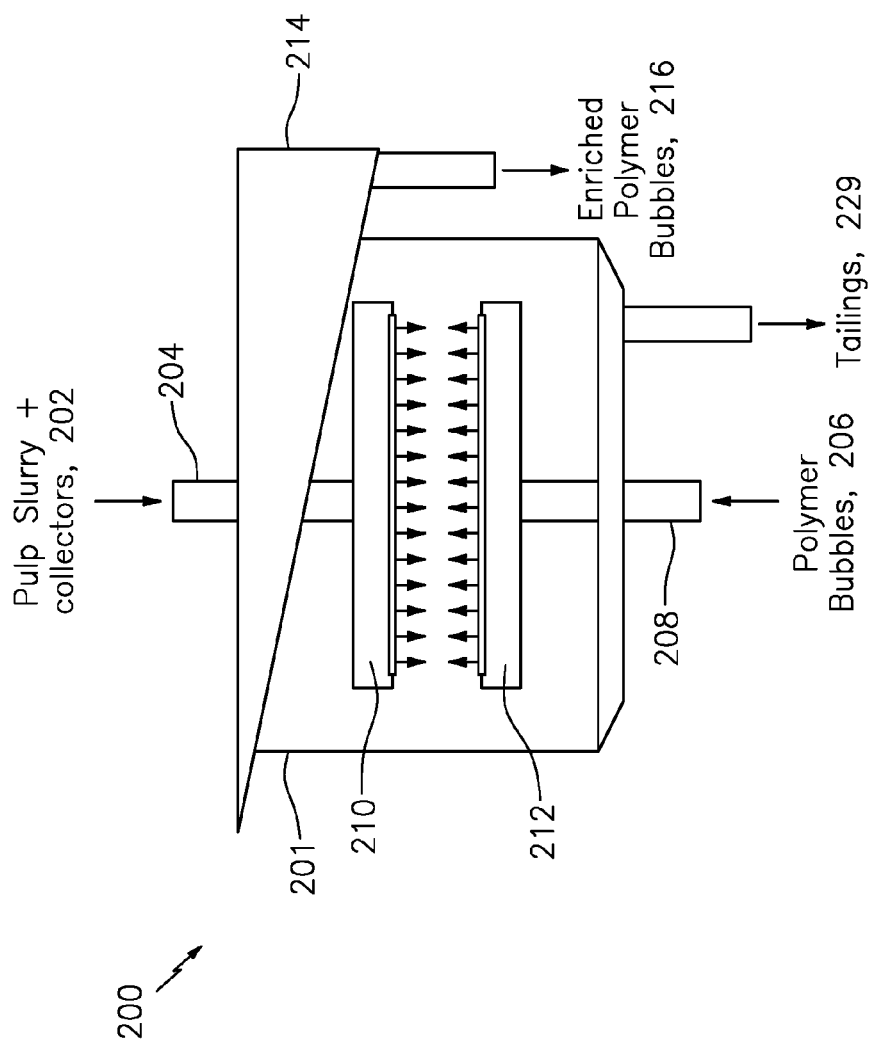
FIG. 12 is a diagram of a flotation cell or column that may be used in place of the flotation cell or column that forms part of the flotation system, process or apparatus shown in FIG. 11 according to some embodiments of the present invention.

FIGS. 11 and 12

Flotation Apparatus

By way of example, FIG. 11 shows the present invention is the form of apparatus 810, having a flotation cell or column 812 configured to receive a mixture of fluid (e.g. water), collector chemicals, valuable material and unwanted material, e.g., a pulp slurry 814; receive hydrophobic synthetic bubbles or beads 70 (FIG. 7, for example) that are constructed to be buoyant when submerged in the pulp slurry or mixture 814. The valuable material, when interacting with the collector chemicals, may become wetted mineral particles. The flotation cell or column 812 is configured to allow the hydrophobic synthetic or polymer bubbles 70 to attach to the wetted valuable material in the pulp slurry or mixture 814; and provide enriched synthetic bubble or beads 75 having the valuable material attached thereon. By way of example, the synthetic bubbles or beads 70 may be made from polymer or polymer-based materials, or silica or silica-based materials, or glass or glass-based materials, although the scope of the invention is intended to include other types or kinds of material either now known or later developed in the future. According to some embodiments of the present invention, the surface of the synthetic or polymer bubbles 70 comprises a plurality of molecules, such as polysiloxanes, that render the surface of the synthetic or polymer bubbles 70 hydrophobic. For the purpose of describing one example of the present invention, in FIG. 11 the hydrophobic synthetic bubbles or beads are shown as polymer or polymer-based bubbles labeled 70, and the enriched synthetic bubble or beads (see FIG. 7*a*) are shown as enriched polymer or polymer-based bubbles labeled 75. The flotation cell or column 812 is configured with a top portion or piping 820 to provide the enriched polymer or polymer-based bubbles 75 from the flotation cell or column 812 for further processing consistent with that set forth herein.

The flotation cell or column 812 may be configured with a top part or piping 822, e.g., having a valve 822*a*, to receive the pulp slurry or mixture 814 and also with a bottom part or piping 824 to receive the polymer or polymer-based bubbles 70. In operation, the buoyancy of the polymer or polymer-based bubbles 70 causes them to float upwardly from the bottom to the top of the flotation cell or column 812 through the pulp slurry or mixture 814 in the flotation cell or column 812 so as to collide with the water, wetted valuable material and unwanted material in the pulp slurry or mixture 814. The hydrophobicity of the polymer or polymer-based bubbles 70 causes them to attach to the wetted valuable material in the pulp slurry or mixture 814. As a result of the collision between the polymer or polymer-based bubbles 70 and the water, valuable material and unwanted material in the pulp slurry or mixture 814, and the attachment of the polymer or polymer-based bubbles 70 and the wetted valuable material in the pulp slurry or mixture 814, the enriched polymer or polymer-based bubbles 75 having the valuable material attached thereto will float to the top of the flotation cell 812 and form part of the froth formed at the top of the flotation cell 812. The flotation cell 812 may include a top part or piping 820 configured to provide the enriched polymer or polymer-based bubbles 75 having the valuable material attached thereto, which may be further processed consistent with that set forth herein. In effect, the enriched polymer or polymer-based bubbles 75 may be taken off the top of the flotation cell 812 or may be drained off by the top part or piping 820.

The flotation cell or column 812 may be configured to contain an attachment rich environment, including where the attachment rich environment has a high pH, so as to encourage the flotation recovery process therein. The flotation recovery process may include the recovery of ore particles in mining, including copper. The scope of the invention is not intended to be limited to any particular type or kind of flotation recovery process either now known or later developed in the future. The scope of the invention is also not intended to be limited to any particular type or kind of mineral of interest that may form part of the flotation recovery process either now known or later developed in the future.

According to some embodiments of the present invention, the polymer or polymer-based bubbles 70 may be configured with a surface area flux by controlling some combination of the size of the polymer or polymer-based bubbles 70 and/or the injection rate that the pulp slurry or mixture 814 is received in the flotation cell or column 812. The polymer or polymer-based bubbles 70 may also be configured with a low density so as to behave like air bubbles. The polymer or polymer-based bubbles 70 may also be configured with a controlled size distribution of medium that may be customized to maximize recovery of different feed matrixes to flotation as valuable material quality changes, including as ore quality changes.

According to some embodiments of the present invention, the flotation cell or column 812 may be configured to receive the polymer or polymer-based bubbles 70 together with air, where the air is used to create a desired froth layer in the mixture in the flotation cell or column 812 in order to achieve a desired grade of valuable material. The polymer or polymer-based bubbles 70 may be configured to lift the valuable material to the surface of the mixture in the flotation cell or column.

The Thickener 828

The apparatus 810 may also include piping 826 having a valve 826*a* for providing tailings to a thickener 828 configured to receive the tailings from the flotation cell or column 812. The thickener 828 includes piping 830 having a valve 830*a* to provide thickened tailings 829. The thickener 828 also includes suitable piping 832 for providing reclaimed water back to the flotation cell or column 812 for reuse in the process. Thickeners like element 828 are known in the art, and the scope of the invention is not intended to be limited to any particular type or kind either now known or later developed in the future.

The Bead Recovery Process or Processor 850

According to some embodiments of the present invention, the apparatus 810 may further comprises a bead recovery process or processor generally indicated as 850 configured to receive the enriched polymer or polymer-based bubbles 75 and provide reclaimed polymer or polymer-based bubbles 852 without the valuable material attached thereon so as to enable the reuse of the polymer or polymer-based bubbles 852 in a closed loop process. By way of example, the bead recovery process or processor 850 may take the form of a washing station whereby the valuable material is mechanically, chemically, or electromagnetically removed from the enriched polymer or polymer-based bubbles 75.

The bead recovery process or processor 850 may include a second flotation cell or column 854 having piping 856 with a valve 856*a* configured to receive the enriched polymer bubbles or beads 75; and substantially release the valuable material from the enriched polymer bubbles or beads 75, and also having a top part or piping 857 configured to provide the reclaimed polymer bubbles or beads 852, substantially without the valuable material attached thereon The second flotation cell or column 854 may be configured to contain a release rich environment, including where the release rich environment has a low pH, or including where the release rich environment results from ultrasonic waves pulsed into the second flotation cell or column 854.

The bead recovery process or processor 850 may also include piping 858 having a valve 856*a* for providing concentrated minerals to a thickener 860 configured to receive the concentrated minerals from the flotation cell or column 854. The thickener 860 includes piping 862 having a valve 862*a* to provide thickened concentrate. The thickener 860 also includes suitable piping 864 for providing reclaimed water back to the second flotation cell or column 854 for reuse in the process. Thickeners like element 860 are known in the art, and the scope of the invention is not intended to be limited to any particular type or kind either now known or later developed in the future.

Embodiments are also envisioned in which the enriched synthetic beads or bubbles are placed in a chemical solution so the valuable material is dissolved off, or are sent to a smelter where the valuable material is burned off, including where the synthetic beads or bubbles are reused afterwards.

The Collision Technique

FIG. 12 shows alternative apparatus generally indicated as 200 in the form of an alternative flotation cell 201 that is based at least partly on a collision technique between the mixture and the synthetic bubbles or beads, according to some embodiments of the present invention. The mixture 202, e.g. the pulp slurry with collector molecules (73, FIG. 7b), may be received in a top part or piping 204, and the synthetic bubbles or beads 206 may be received in a bottom part or piping 208. The flotation cell 201 may be configured to include a first device 210 for receiving the mixture 202, and also may be configured to include a second device 212 for receiving the polymer-based materials. The first device 210 and the second device 212 are configured to face towards one another so as to provide the mixture 202 and the synthetic bubbles or beads 206, e.g., polymer or polymer-based materials, using the collision technique. In FIG. 12, the arrows 210a represent the mixture being sprayed, and the arrows 212a represent the synthetic bubbles or beads 206 being sprayed towards one another in the flotation cell 201.

In operation, the collision technique causes vortices and collisions using enough energy to increase the probability of touching of the polymer or polymer-based materials 206 and the valuable material in the mixture 202, but not too much energy to destroy bonds that form between the polymer or polymer-based materials 206 and the valuable material in the mixture 202. Pumps, not shown, may be used to provide the mixture 202 and the synthetic bubbles or beads 206 are the appropriate pressure in order to implement the collision technique.

By way of example, the first device 210 and the second device 212 may take the form of shower-head like devices having a perforated nozzle with a multiplicity of holes for spraying the mixture and the synthetic bubbles or beads towards one another. Shower-head like devices are known in the art, and the scope of the invention is not intended to be limited to any particular type or kind thereof either now known or later developed in the future. Moreover, based on that disclosed in the instant patent application, a person skilled in the art without undue experimentation would be able to determine the number and size of the holes for spraying the mixture 202 and the synthetic bubbles or beads 206 towards one another, as well as the appropriate pumping pressure in order to provide enough energy to increase the probability of touching of the polymer or polymer-based materials 206 and the valuable material in the mixture 202, but not too much energy to destroy bonds that form between the polymer or polymer-based materials 206 and the valuable material in the mixture 202.

As a result of the collision between the synthetic bubbles or beads 206 and the mixture, enriched synthetic bubbles or beads having the valuable material attached thereto will float to the top and form part of the froth in the flotation cell 201. The flotation cell 201 may include a top part or piping 214 configured to provide enriched synthetic bubbles or beads 216, e.g., enriched polymer bubbles as shown, having the valuable material attached thereto, which may be further processed consistent with that set forth herein.

The alternative apparatus 200 may be used in place of the flotation columns or cells, and inserted into the apparatus or system shown in FIG. 11, and may prove to be more efficient than using the flotation columns or cells.

Figure 14:
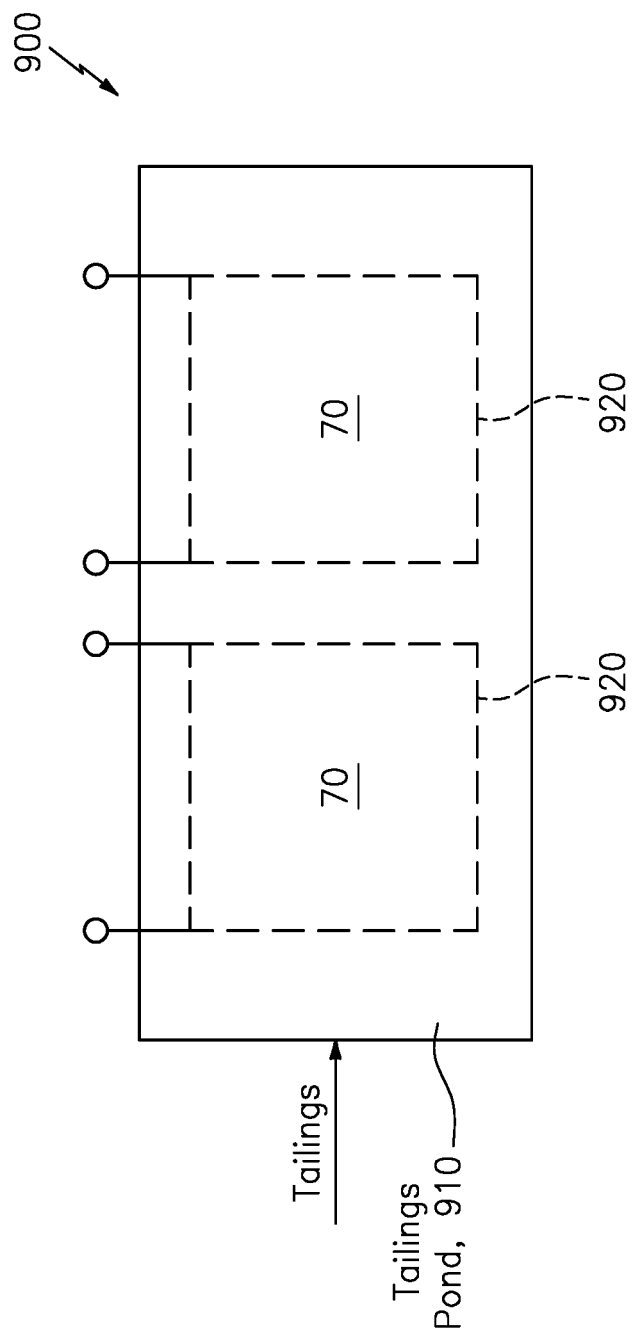
FIG. 14 is a diagram showing the synthetic beads or bubbles are used to collect valuable material in the tailings, according to some embodiments of the present invention.

It should be noted that, the tailings 829 (FIG. 11) and tailings 229 are usually transported to a tailings pond. The tailings may still contain about 15% of the valuable material. The hydrophobic synthetic bubbles or beads 70, according to some embodiments of the present invention, could also be used to recover the valuable material in the tailings as shown in FIG. 14.

FIG. 13

Horizontal Pipeline

Figure 13:
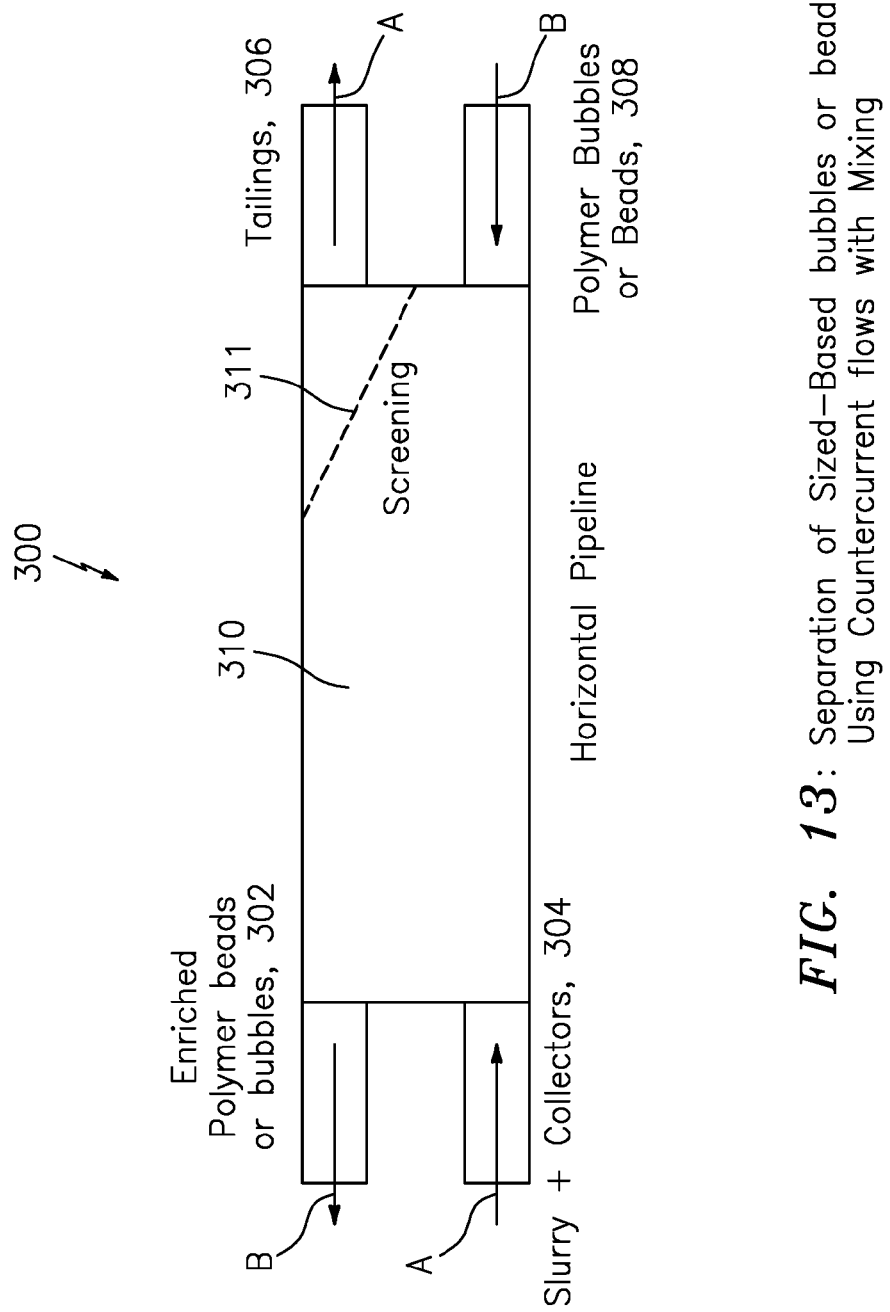
FIG. 13 is a diagram of an apparatus using counter-current flow for mineral separation, according to some embodiments of the present invention.

According to some embodiments of the present invention, the separation process can be carried out in a horizontal pipeline as shown in FIG. 13. As shown in FIG. 13, the hydrophobic synthetic bubbles or beads 308 may be used in, or form part of, a size-based separation process using countercurrent flows with mixing implemented in apparatus such as a horizontal pipeline generally indicated as 300. In FIG. 13, the horizontal pipeline 310 is configured with a screen 311 to separate the enriched synthetic bubbles or beads 302 having the valuable material attached thereto from the mixture based at least partly on the difference in size. The horizontal pipeline 310 may be configured to separate the enriched synthetic bubbles or beads 302 having the valuable material attached thereto from the mixture using countercurrent flows with mixing, so as to receive in the horizontal pipeline 310 slurry 304 flowing in a first direction A, receive in the horizontal pipeline 300 synthetic bubbles or beads 308 flowing in a second direction B opposite to the first direction A, provide from the horizontal pipeline 308 the enriched synthetic bubbles or beads 302 having the valuable material attached thereto and flowing in the second direction B, and provide from the horizontal pipeline 310 waste or tailings 306 that is separated from the mixture using the screen 311 and flowing in the second direction B. In a horizontal pipeline 310, it is not necessary that the synthetic beads or bubbles 308 be lighter than the slurry 304. The density of the synthetic beads or bubbles 308 can be substantially equal to the density of the slurry 304 so that the synthetic beads or bubbles can be in a suspension state while they are mixed with slurry 304 in the horizontal pipeline 310. It should be noted that collectors for wetting the mineral particles in the slurry 304 can be added to the slurry 304 before or after the slurry 304 is received into the horizontal pipeline 310.

A Physical Property

For the purpose of describing and understanding the present invention, a physical property is understood to be any quality that is a measurable whose value describes a physical system's state. Changes in the physical properties of a system can be used to describe its transformations (or evolutions between its momentary states). Physical properties can be intensive or extensive, where an intensive property does not depend on the size or amount of matter in the object, while an extensive property does. Physical properties are contrasted with chemical properties which determine the way a material behaves in a chemical reaction. Physical properties are properties that do not change the chemical nature of matter.

By way of example, the present invention is described in relation to physical property of the synthetic beads or bubbles that take the form of size, weight, magnetism and density. However, embodiments of the present invention are envisioned using other types or kinds of physical properties either now known or later developed in the future, including electrostatic charge, as well as other types or kinds of physical properties that would allow, or provide for, the synthetic bead having the valuable material attached thereto to be separated from the mixture based at least partly on a difference in the physical property between the enriched synthetic bubbles or beads having the valuable material attached thereto and the mixture, consistent with that set forth herein.

Applications

The scope of the invention is described in relation to mineral separation, including the separation of copper or other minerals from ore.

By way of example, applications are envisioned to include rougher, scavenger, cleaner and rougher/scavenger separation cells in the production stream, replacing the traditional flotation machines.

Augmentation of existing flotation machines to combine the polymer beads and bubbles of the present invention with traditional air bubbles (see FIG. 19), so as to either replace, fortify, augment or otherwise aid the air bubbles in the separation of mineral particles that would otherwise not be recovered in traditional flotation machines using air alone.

Tailings scavenger cells used to scavenge the unrecovered minerals from a tailings stream.

Tailings cleaning cell use to clean unwanted material from the tailings stream before it is sent to the disposal pond.

Tailings reclamation machine that is placed in the tailings pond or otherwise used to recover valuable mineral that has been sent to the tailings pond.

The tailings received in a tailings pond can be process to recover valuable mineral therein using the hydrophobic synthetic bubbles or beads, according to various embodiments of the present invention. It is understood that the valuable material in the tailing ponds are wetted mineral particles or mineral particles that are not wetted. It is possible to put additional collector chemicals, such as xanthates, in the tailings pond to cause the mineral particles to become wetted. By way of example, a cage or net 920 containing hydrophobic bubbles or beads 70 can be placed in a tailings pond 910 for a certain period of time, says hours, days or weeks, so as to allow the wetted mineral particles to be attached to the hydrophobic bubbles or beads 70. In this application, the hydrophobic bubbles or beads 70 are configured to have a density substantially equal to the density of the tailings. As such, the hydrophobic synthetic bubbles or beads 70 can be in a suspension state, instead of moving up to the top or sinking to the bottom of the cage or net 920. The size of the hydrophobic synthetic bubbles or beads 70 can be as small as 100 μm, for example. However, for the ease of operation, the size of the hydrophobic synthetic bubbles or beads 70 can be 1 mm or 1 cm or larger. The cage or net 920 should have holes or a mesh size smaller than the beads but large enough to allow the tailings to get through in order to interact with the hydrophobic synthetic bubbles or beads.

It is possible to move or shake the cage or net 920 so as to increase the contact between the wetted mineral particles in the tailings and the hydrophobic synthetic bubbles or beads 70 in the tailings pond 910. A diagram illustrating tailings pond mineral recovery is shown in FIG. 14 in a setup or apparatus 900.

Figure 15:
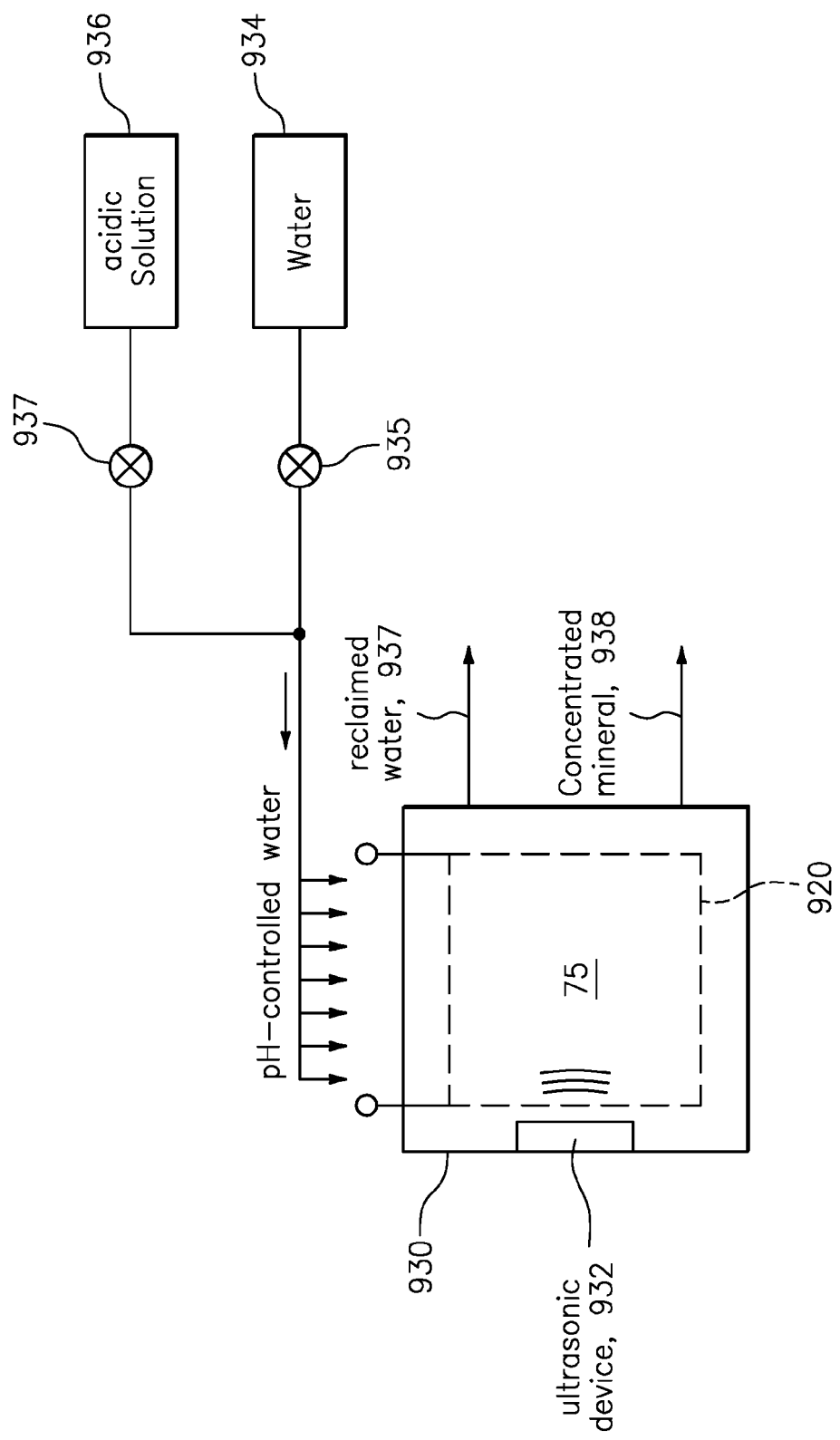
FIG. 15 is a diagram showing the releasing of the valuable material from the enriched synthetic beads or bubbles, according to some embodiments of the present invention.

After a certain time period, at least part of the hydrophobic synthetic bubbles or beads 70 become enriched hydrophobic synthetic bubbles or beads 75, the cage or net 920 containing the enriched bubbles or beads 75 is taken out of the tailings pond and placed into a release chamber 930. The releasing chamber 930 is arranged to receive pH-controlled aqueous solution from a water source 934 through a valve 935 and an acidic solution source 936 through a valve 937, for example. A low pH mixture having a pH value ranged from 1-6, for example, in the release chamber 930 could help releasing the valuable material from the surface of the enriched bubbles or beads 75. The pH value in the release chamber 930 can be as low as 0 and as high as 7. The released value material 938 could be channeled out of the release chamber for further processing. The excess pH-controlled water or solution 937 can be reclaimed for further use or discarded. An ultrasonic source or device 932 can also be used to apply ultrasound waves to the enriched bubbles or beads 75 for mineral releasing. A diagram illustrating the mineral releasing is shown in FIG. 15 in a setup or apparatus 925. After the mineral attached to the enriched hydrophobic synthetic bubbles or beads 75 is substantially released, the cage or net 920 containing the hydrophobic synthetic bubbles or beads 75 can again be placed in the tailings pond as shown in FIG. 14. It is also possible to recharge the synthetic bubbles or beads by applying a new coating of hydrophobic chemical thereon.

In many releasing environments, the pH value is lower than the pH value for mineral attachment. It should be noted that, however, when the valuable material is copper, for example, it is possible to provide a lower pH environment for the attachment of mineral particles and to provide a higher pH environment for the releasing of the mineral particles from the synthetic beads or bubbles. In general, the pH value is chosen to facilitate the strongest attachment, and a different pH value is chosen to facilitate release. Thus, according to some embodiments of the present invention, one pH value is chosen for mineral attachment, and a different pH value is chosen for mineral releasing. The different pH could be higher or lower, depending on the specific mineral and collector.

Figure 16:
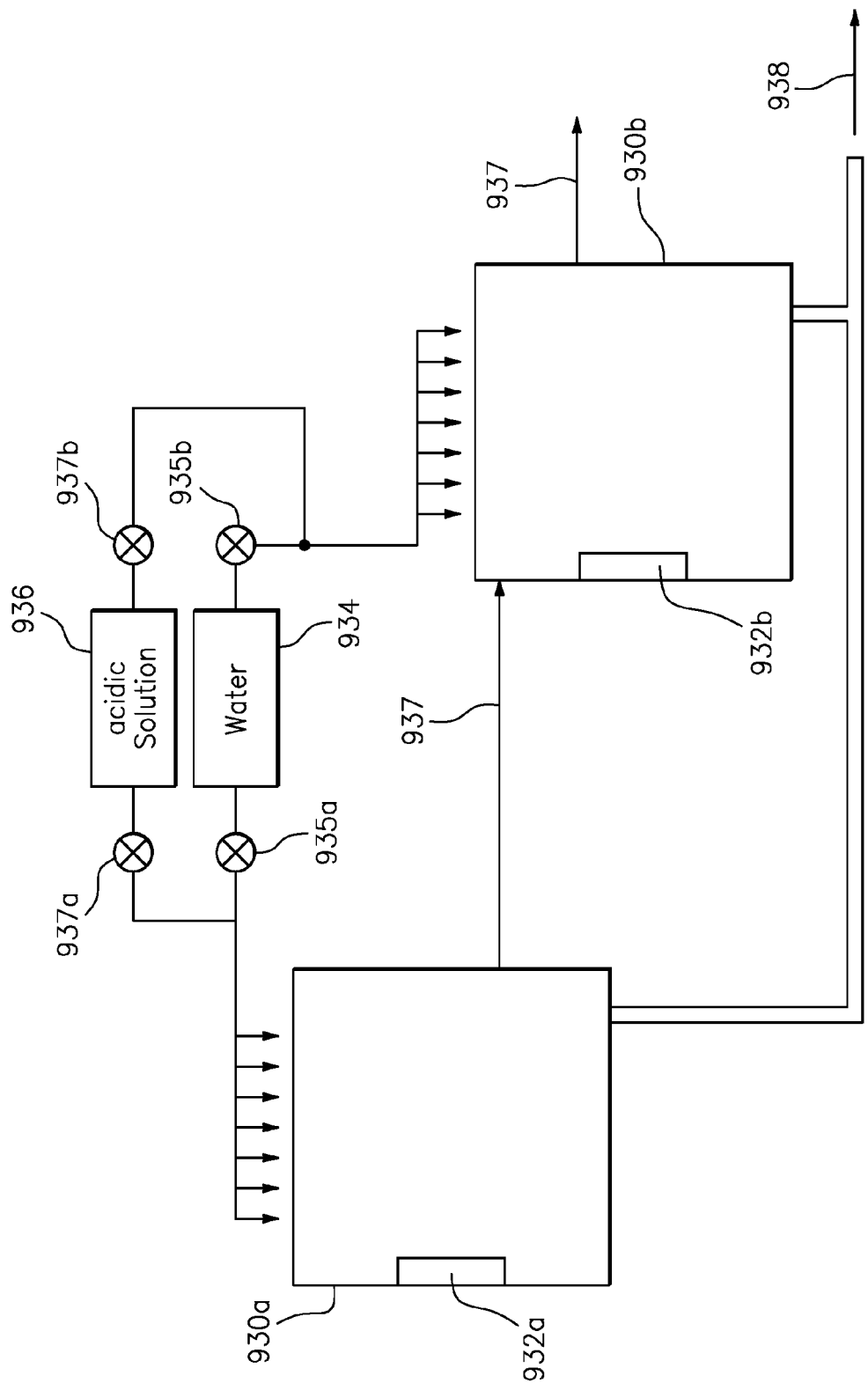
FIG. 16 is a diagram showing the releasing of the valuable material from the enriched synthetic beads or bubbles in multiple stages, according to some embodiments of the present invention.

The releasing of the mineral from the enriched synthetic bubbles or beads can be carried out in multiple stages, as shown in FIG. 16. As shown in FIG. 16, the arrangement or apparatus 927 has two or more release chambers 930a, 930b being used to remove the valuable material from the enriched hydrophobic bubbles or beads 75 in a manner similar to a single release chamber as depicted in FIG. 15.

In a typical mineral separation process, an ore is blasted into manageable pieces of mineral containing rock. The blasted ore is then subjected to grinding where the rock is crushed into small particles in the order of 100 μm. The particles are referred herein as mineral particles but they also contain silicate minerals or oxide minerals of little or no value. These mineral particles, along with gangue minerals, are mixed with water into a pulp slurry. The synthetic beads, according to some embodiments of the present invention, are used to attract the mineral particles to the bead surface. The enriched synthetic beads, which are the synthetic beads having the mineral particles attached thereon, are then separated from the unwanted rock or gangue minerals by means of size-based separation, weight-based separation and/or magnetic-based separation. For example, the separation can take place in a flotation cell, in a pipeline where the pulp slurry is transported from one location to another location, and in a mixing vat. Thereafter the mineral particles attached to the enriched synthetic beads are then released from the synthetic beads for further processing, such as smelting. The releasing of the mineral particles from the synthetic beads can be carried out in different manners. For example, the enriched synthetic beads can be configured to contact a solution with a low pH value that interrupts or weakens the bonds between the mineral particles and the bead surfaces. It is also possible to submerge the enriched synthetic beads in a solution where ultrasonic waves are used to shake loose the mineral particles from the bead surface. The releasing can be carried out thermally or electromagnetically. For example, the enriched synthetic beads can be subjected to a hot-water wash to weaken the chemical bond of the functional groups. The enriched synthetic beads can also be subjected to laser illumination where a selected laser frequency is used to weaken the chemical bond. After the releasing process, the reclaimed synthetic beads can be reused or discarded. The reclaimed synthetic beads may be recharged in order to replenish the lost functional groups during the separation and releasing processes. In order to determine whether the reclaimed synthetic beads are reusable or worth recharging, a fluorescent element can be incorporated onto the surface of the synthetic beads together with the functional groups. The fluorescent element is used as a tag for tracing such that the intensity of the fluorescence when the fluorescent element is excited can be used as a gauge.

The hydrophobic synthetic bubbles or beads, according to various embodiments of the present invention, can also be used in a dry separation process where the crushed particles are configured to contact with the hydrophobic synthetic bubbles or beads by dry mixing. Alternatively, the hydrophobic synthetic bubbles or beads can be contained in a filter and the crushed particles are forced by forced air to pass through the filter. Again, the mineral particles attached on the enriched synthetic beads can be released in a low pH environment, in an ultrasonic agitation environment, in a hot water bath or in a laser illuminated area.

The synthetic beads, according to some embodiments of the present invention, can be made with different sizes in order to attract mineral particles of different sizes. For example, unlike air bubbles, the synthetic beads of a larger size can be used to separate or float mineral particles larger than, say, 200 μm. Thus, the grinding of the blasted ore can be separated into different stages. In the first stage, the rock is crushed into particles in the order of 200 μm. After the separation process using the larger synthetic beads in the slurry containing these crude particles, the remaining slurry can be subjected to a finer grinding stage where the crushed rock is further crushed into particles in the order of 100 μm. With the slurry containing the finer mineral particles, synthetic beads with a smaller size may be more effective in interacting with the finer mineral particles. In a flotation cell application, the bead size can be smaller than 100 μm. In a tailings pond application, the bead size can be 1 mm to 10 mm or larger. However, large beads would reduce the hydrophobic surfaces where the wetted mineral particles can attach to the hydrophobic beads. 17. Thus, according to some embodiments of the present invention, the synthetic beads are configured with a size less than 100 μm for attracting to mineral particles having a substantially similar size, including in applications related to flotation cells; the synthetic beads are configured with a size of about 100 μm for attracting or attaching to mineral particles having a substantially similar size, smaller size or larger size; the synthetic beads are configured with a size in a range of about 50-500 μm for attracting or attaching to mineral particles having a substantially similar size, larger size or smaller size; the synthetic beads are configured with a size about 200 μm for attracting or attaching to mineral particles having a substantially similar size; the synthetic beads are configured with a size in a range of about 1 mm to 10 mm, including in applications related to a tailings pond. In general the synthetic beads are configured with a size in a range of about 50 μm to 10 mm. But the synthetic beads can be smaller than 50 μm and can be larger than 10 mm.

It should be noted that, the synthetic beads, according to some embodiments of the present invention, can be used in tailings scavenger cells to scavenge the unrecovered minerals from a tailings stream. The synthetic beads can also be used in a disposal pond or the tailings ponds.

As described in the specification, ore mining is typically associated with copper and nickel. However, other types or kinds of valuable material or minerals of interest, include gold, molybdenum, etc.

It should be noted that the synthetic beads or bubbles, according to some embodiments, can be used to collect non-mineral related hydrophobic particles as well. Therefore, the synthetic beads or bubbles of the present invention include the synthetic bead arranged to contact with an aqueous mixture comprising solid hydrophobic particles, wherein the synthetic bead comprises a solid-phase body comprising a surface; and a plurality of molecules attached to the surface, the molecules comprising a functional group selected to render the surface hydrophobic. It is followed that the method of using the synthetic beads or bubbles, according to some embodiments of the present invention, includes receiving an aqueous mixture in a processor, the mixture comprising solid hydrophobic particles; causing a plurality of synthetic beads to contact with the aqueous mixture in the processor, wherein the synthetic bead comprises a solid-phase body comprising a surface; and a plurality of molecules attached to the surface, the molecules comprising a functional group selected to render the surface hydrophobic. At least the surface of the solid-phase body made of or coated with a hydrophobic polymer, such as polystyrene, or a hydrophobically-modified polymer, such as hydrophobically-modified ethyl hydroxyethyl cellulose. In a different application, the method comprises arranging a plurality of synthetic beads to contact with an aqueous mixture comprising solid hydrophobic particles; allowing the solid hydrophobic particles to attach to the synthetic beads for providing a plurality of enriched synthetic beads, the enriched synthetic beads comprising some of the solid hydrophobic particles attached to the surface of the synthetic beads; removing the enriched synthetic beads from the aqueous mixture; and releasing some of the solid hydrophobic particles from the surface of the synthetic beads, wherein the synthetic bead comprises a solid-phase body comprising a surface; and a plurality of molecules attached to the surface, the molecules comprising a functional group selected to render the surface hydrophobic. Thus, the hydrophobic synthetic bubbles or beads, according to the present invention, can be used in a body of water, natural or man-made (including lake, river, stream, irrigation canal, pool); water in drainage, water treatment pools. Thus, the tailings pond 900 as depicted in FIG. 14 can also be considered as a body of water or a pool of water in which the hydrophobic beads can be used for pollution control or other water treatment purposes. Furthermore, the particle 71' as shown in FIG. 7b can be a valuable material from an ore, but it can also be non-mineral particle and something to be rid of from the water. For example, the particle 71' can be some heavy metal that is harmful for the environment.

Figure 17B:
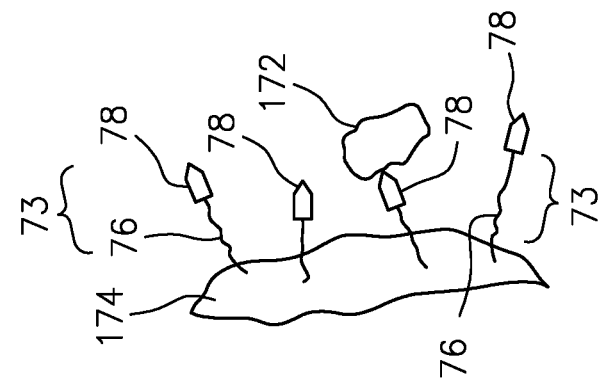
FIG. 17b illustrates an enlarged portion of the synthetic bead surface showing a mineral particle attached to the functionalized surface of the synthetic bead, according to some embodiments of the present invention.
Figure 17A:
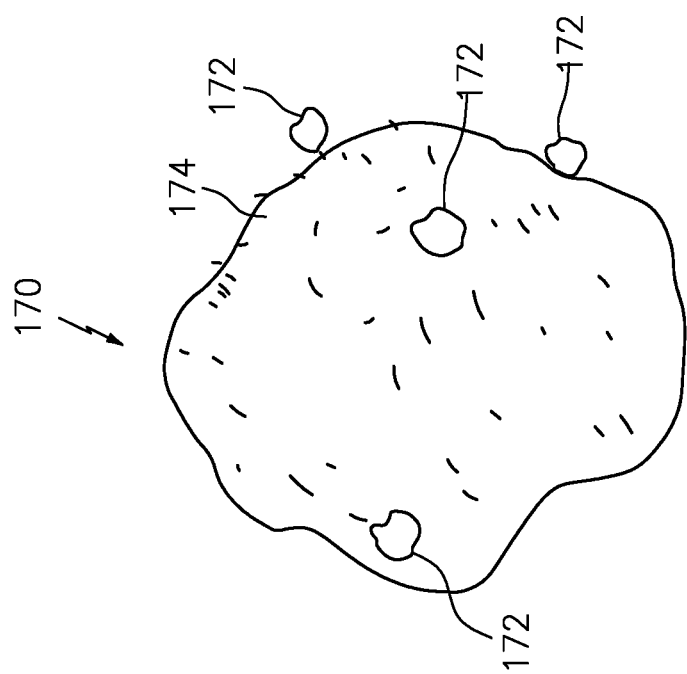
FIG. 17a shows a generalized synthetic bubble or bead which can be a size-based bead or bubble, weight-based polymer beads and bubbles, and magnetic-based beads and bubbles, wherein the bead surface is functionalized to attract mineral particles to the surface, according to some embodiments of the present invention.

It should be understood that the synthetic bubble or bead as shown in FIGS. 1-6, 8a-10c, can be functionalized to attract the valuable material in a different way. FIG. 17a shows a generalized synthetic bubble or bead which can be a size-based bead or bubble, weight-based beads and bubbles, and magnetic-based beads and bubbles, having some particles attached to the surface. FIG. 17b illustrates an enlarged portion of the synthetic bead surface showing a mineral particle attached to the functionalized surface of the synthetic bead. As shown in FIG. 17a, the synthetic bubble or bead 170 has a bead body to provide a bead surface 174. At least the outside part of the bead body is made of a synthetic material, such as a functionalized polymer, or a coating of a functionalized polymer to attract mineral particles 172. As shown in FIG. 17*b*, the surface 174 of the synthetic bubble or bead is functionalized to provide a plurality of molecules 73. Each of the molecule 73 has a functional group to attract the mineral particle 172. The molecule 73 also has a molecular segment (such as hydrocarbon chain) 76 attached to the bead surface 174. The molecule 73 is also known as a collector molecule, such as a xanthate. The functional group 78 is also known as a collector that is either ionic or non-ionic. The ion can be anionic or cationic. An anion includes oxyhydryl, such as carboxylic, sulfates and sulfonates, and sulfhydral, such as xanthates and dithiophosphates. Other molecules or compounds that can be used to provide the functional group 78 include thionocarboamates, thioureas, xanthogens, monothiophosphates, hydroquinones and polyamines. The synthetic bead 170 can be made of a polymer or coated with a polymer comprising a plurality of molecules 73 to provide the functional groups 78. The term "polymer" means a large molecule made of many units of the same or similar structure linked together. The unit can be a monomer or an oligomer which forms the basis of, for example, polyester, urethane, ester, polyester, amide, polyurea, acrylyte, polyolefin, phenolic resin, polydimethylsiloxane, polyvinyl chloride, polyethylene, polypropylene, polyvinylidene fluoride, and other organic or inorganic polymers. Thus, the synthetic material can be hard or rigid like plastic or soft and flexible like an elastomer. While the physical properties of the synthetic beads can vary, the surface of the synthetic beads is chemically functionalized to provide a plurality of functional groups to attract mineral particles. The terms "valuable material" and "mineral particle" are used interchangeable.

Figure 18B:
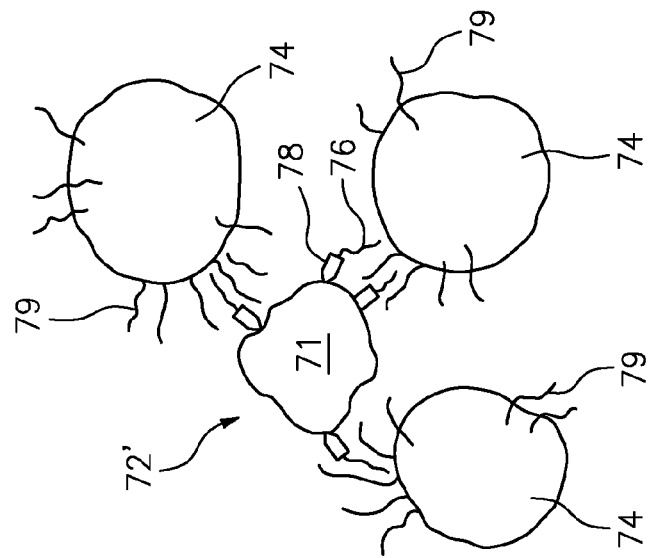
FIG. 18b illustrates a wetted mineral particle being attached to a number of slightly larger hydrophobic synthetic beads at the same time, according to some embodiments of the present invention.
Figure 18A:
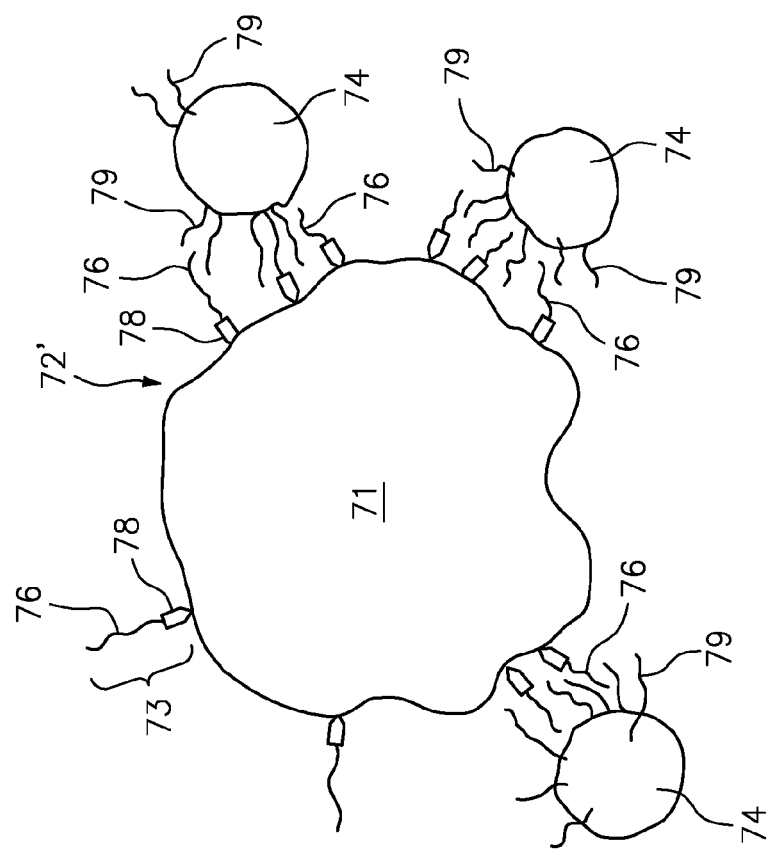
FIG. 18a illustrates a wetted mineral particle being attached to a number of much smaller hydrophobic synthetic beads at the same time, according to some embodiments of the present invention.

FIG. 18*a* illustrates a scenario where a wetted mineral particle 72' is attached to a number of hydrophobic synthetic beads 74 at the same time. Thus, although the synthetic beads 74 are much smaller in size than the wetted mineral particle 72', a number of synthetic beads 74 may be able to lift the wetted mineral particle 72' upward in a flotation cell. A wetted mineral particle 72' comprises a mineral particle 71 having one or more collector molecules 73 attached thereto. Likewise, a smaller wetted mineral particle 72' can also be lifted upward by a number of hydrophobic synthetic beads 74 as shown in FIG. 18*b*. In order to increase the likelihood for this "cooperative" lifting to occur, a large number of hydrophobic synthetic beads 74 can be mixed into the slurry. Unlike air bubbles, the density of the synthetic beads can be chosen such that the synthetic beads may stay along in the slurry before they rise to surface in a flotation cell.

According to some embodiments of the present invention, the synthetic beads 74, 174 are configured to be larger than the mineral particles 72', 172 as shown in FIGS. 7*a* and 17*a*. As such, a plurality of mineral particles 72', 172 may attach to one synthetic bead 74, 174. According to other embodiments of the present invention, the synthetic beads 74 are configured to be smaller than the mineral particles 71 as shown in FIG. 18*a*. As such, a plurality of synthetic beads 74 may attach to one mineral particle 71. The size of the synthetic beads 74 can also be about the same as the size of the mineral particle 71 as shown in FIG. 18*b*.

Figure 19:
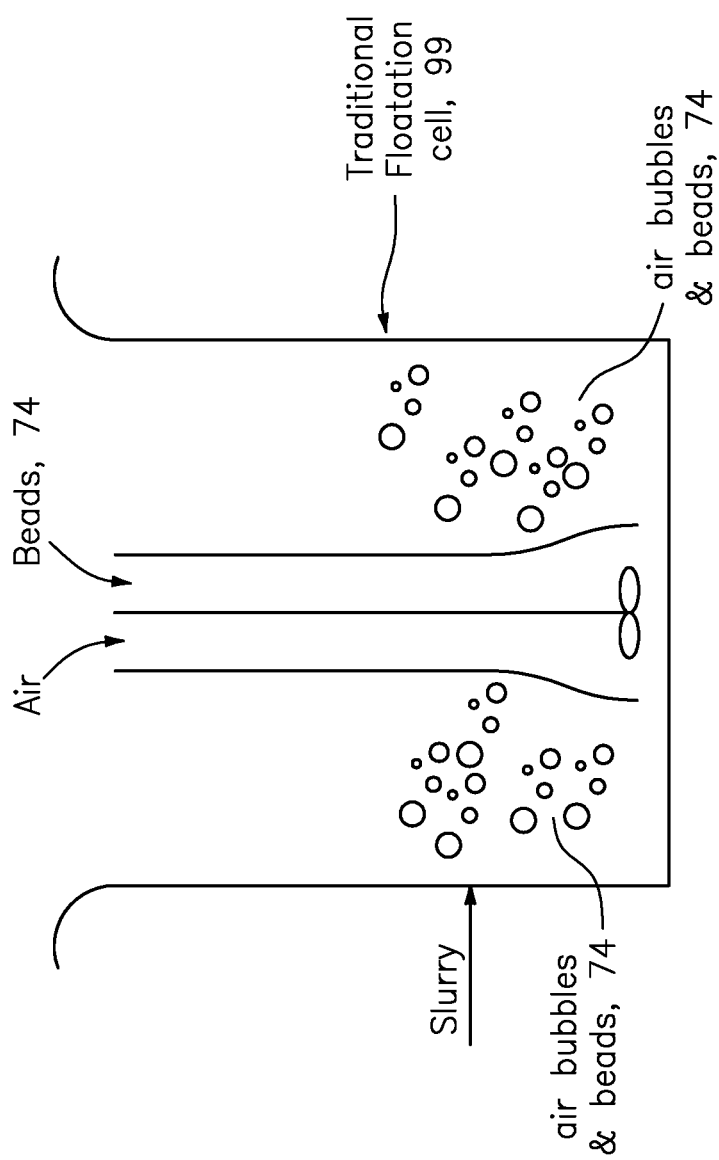
FIG. 19 is a diagram showing the synthetic beads, according to some embodiments of the present invention, are combined with air for use in a flotation cell.

FIG. 19 is a diagram showing the synthetic beads 74, according to some embodiments of the present invention, are used in a traditional flotation cell 99 for the augmentation of existing flotation process. The synthetic beads and bubbles 74 of the present invention are mixed with traditional air bubbles, so as to either replace, fortify, augment or otherwise aid the air bubbles in the separation of mineral particles that would otherwise not be recovered in traditional flotation machines using air alone.

According to some embodiments of the present invention, only a portion of the surface of the synthetic bead 74 is functionalized to be hydrophobic. This has the benefits as follows:

1. Keeps too many beads from clumping together—or limits the clumping of beads,
2. Once a mineral is attached, the weight of the mineral is likely to force the bead to rotate, allowing the bead to be located under the bead as it rises through the flotation cell;
    a. Better cleaning as it may let the gangue to pass through
    b. Protects the attached mineral particle or particles from being knocked off, and
    c. Provides clearer rise to the top collection zone in the flotation cell.

According to some embodiments of the present invention, only a portion of the surface of the synthetic bead is functionalized with collectors. This also has the benefits of 1. Once a mineral is attached, the weight of the mineral is likely to force the bead to rotate, allowing the bead to be located under the bead as it rises through the flotation cell;
    a. Better cleaning as it may let the gangue to pass through
    b. Protects the attached mineral particle or particles from being knocked off, and
    c. Provides clearer rise to the top collection zone in the flotation cell.

Figure 20A:
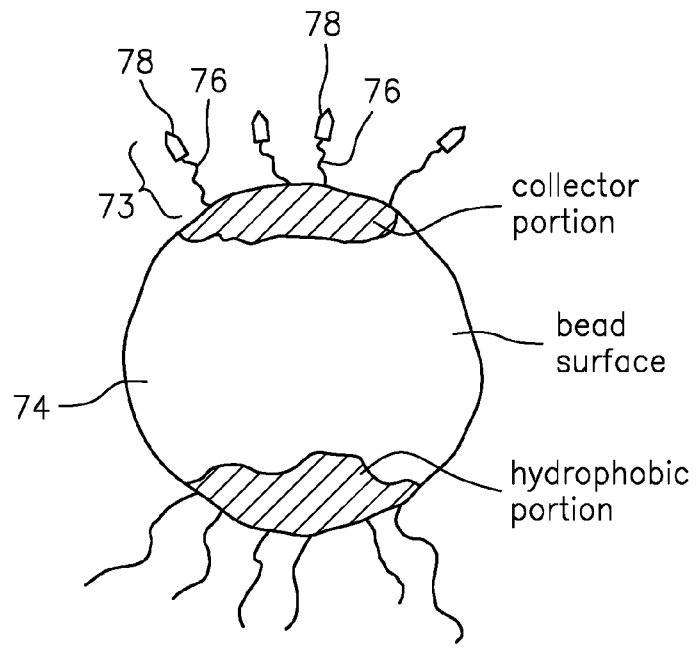
FIGS. 20a and 20b illustrate some embodiments of the present invention wherein the synthetic bead or bubble have one portion functionalized to have collector molecules and another portion functionalized to be hydrophobic, according to some embodiments of the present invention.
Figure 20B:
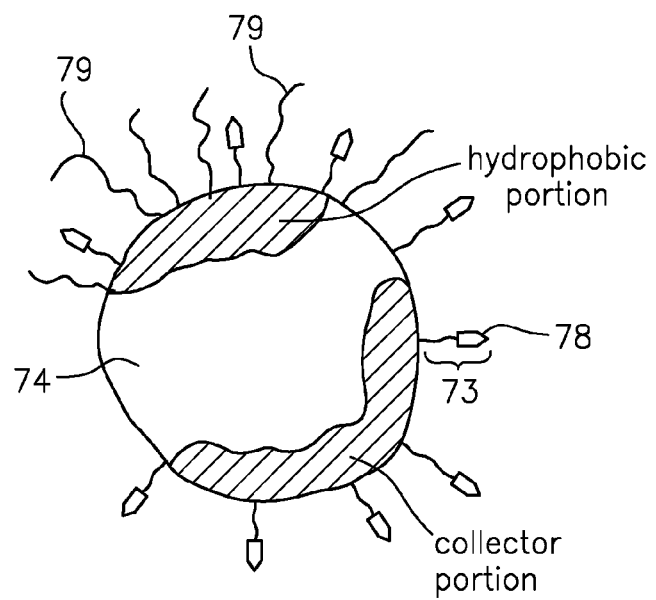

According to some embodiments of the present invention, one part of the synthetic bead is functionalized with collectors while another part of same synthetic bead is functionalized to be hydrophobic as shown in FIGS. 20*a* and 20*b*. As shown in FIG. 20*a*, a synthetic bead 74 has a surface portion where polymer is functionalized to have collector molecules 73 with functional group 78 and molecular segment 76 attached to the surface of the bead 74. The synthetic bead 74 also has a different surface portion where polymer is functionalized to have hydrophobic molecules 79. In the embodiment as shown in FIG. 20*b*, the entire surface of the synthetic bead 74 can be functionalized to have collector molecules 73, but a portion of the surface is functionalized to have hydrophobic molecules 79 render it hydrophobic.

According to some embodiments of the present invention, one part of the synthetic bead is functionalized with collectors while another part of same synthetic bead is functionalized to be hydrophobic and this "hybrid" synthetic bead is configured for use in a traditional flotation cell as well. The "hybrid" synthetic bead (see FIGS. 20*a* and 20*b*) has a hydrophobic portion and a separate collector portion. When the "hybrid" beads are mixed with air in the flotation cell, some of them will attach to the air bubbles because of the hydrophobic portion. As the "hybrid" synthetic bead is attached to an air bubble, the collector portion of the attached bead can collect mineral particles with the functional groups. Thus, the synthetic beads, according to some embodiments of the present inventions, can be used to replace the air bubbles, or to work together with the air bubbles in a flotation process.

This "hybrid" synthetic bead can collect mineral particles that are wet and not wet.

According to some embodiments of the present invention, the surface of a synthetic bead can be functionalized to have a collector molecule. The collector has a functional group with an ion capable of forming a chemical bond with a mineral particle. A mineral particle associated with one or more collector molecules is referred to as a wetted mineral particle. According to some embodiments of the present invention, the synthetic bead can be functionalized to be hydrophobic in order to collect one or more wetted mineral particles.

It should be understood that the synthetic beads according to the present invention, whether functionalized to have a collector or functionalized to be hydrophobic, are also configured for use in oilsands separation—to separate bitumen from sand and water in the recovery of bitumen in an oilsands mining operation. Likewise, the functionalized filters and membranes, according to some embodiments of the present invention, are also configured for oilsands separation.

The scope of the invention is intended to include other types or kinds of applications either now known or later developed in the future.

The Scope of the Invention

It should be further appreciated that any of the features, characteristics, alternatives or modifications described regarding a particular embodiment herein may also be applied, used, or incorporated with any other embodiment described herein. Although the invention has been described and illustrated with respect to exemplary embodiments thereof, the foregoing and various other additions and omissions may be made therein and thereto without departing from the spirit and scope of the present invention.

What is claimed is:

1. A synthetic bead, said synthetic bead comprising:
a solid-phase body comprising a surface; and
a synthetic material provided on at least a portion of the surface, the synthetic material comprises a plurality of molecules configured to render at least said portion of the surface hydrophobic, and the molecules also being configured to attract to the surface solid hydrophobic particles having mineral particles contained in an aqueous mixture, the mineral particles having hydrophobic element attached thereon, wherein the solid-phase body comprises an outer part made of glass, ceramic or a polymer for providing the surface and wherein the synthetic material comprise a siloxane derivative, or polysiloxanates, hydroxyl-terminated polydimethylsiloxanes, or is selected from a group consisting of poly(dimethylsiloxane), hydrophobically-modified ethyl hydroxyethyl cellulose polysiloxanates, alkylsilane and fluoroalkylsilane.

2. The synthetic bead according to claim 1, wherein the solid-phase body comprises an outer part made of metal for providing the surface.

3. The synthetic bead according to claim 1, wherein the synthetic bead has a different density than the aqueous mixture so as to float or sink therein.

4. The synthetic head according to claim 1, wherein the synthetic bead has substantially the same density as the aqueous mixture so as to neither float nor sink therein.

5. The synthetic bead according to claim 1, wherein the surface comprises physical structures configured to trap the mineral particles.

6. The synthetic bead according to claim 5, wherein the physical structures comprise grooves or dents.

7. The synthetic bead according to claim 6, wherein the physical structures comprise hair-like structures.

8. The synthetic bead according to claim 1, wherein the mineral particles have a maximum size and the solid-phase body has a body size greater than the maximum size.

9. The synthetic bead according to claim 1, wherein the mineral particles have a minimum size and the solid-phase body has a body size smaller than the minimum size.

10. The synthetic bead according to claim 1, wherein the surface is also configured with a functional group so as to be a collector for also attracting the mineral particles to the surface.

11. The synthetic bead according to claim 1, wherein the synthetic beads are configured with a size less than 100 μm for attracting to mineral particles having a substantially similar size, including in applications related to flotation cells.

12. The synthetic bead according to claim 1, wherein the synthetic beads are configured with a size of about 100 μm for attracting or attaching to mineral particles having a substantially similar size, smaller size or larger size.

13. The synthetic bead according to claim 1, wherein the synthetic beads are configured with a size in a range of about 50-500 μm for attracting or attaching to mineral particles having a substantially similar size.

14. The synthetic bead according to claim 1, wherein the synthetic beads are configured with a size about 200 μm for attracting or attaching to mineral particles having a substantially similar size.

15. The synthetic bead according to claim 1, wherein the synthetic beads are configured with a size in a range of about 1 mm to 10 mm, including in applications related to a tailings pond.

16. The synthetic bead according to claim 1, wherein the synthetic beads are configured with a size in a range of about 50 μm to 10 mm.

17. A method comprising:
receiving an aqueous mixture in a processor, the mixture comprising solid hydrophobic particles having mineral particles with hydrophobic elements attached thereon;
causing a plurality of synthetic beads to contact with the aqueous mixture in the processor,
said synthetic bead comprising:
a surface; and
a synthetic material provided on the surface, the synthetic material comprising a plurality of molecules configured to render the surface hydrophobic, the molecules being configured to attract to the surface the solid hydrophobic particles in the aqueous mixture, wherein the solid-phase body comprises an outer part made of glass, ceramic or a polymer, and wherein the synthetic material comprise a siloxane derivative, or polysiloxanates, hydroxyl-terminated polydimethylsiloxanes, or is selected from a group consisting of poly(dimethylsiloxane), hydrophobically-modified ethyl hydroxyethyl cellulose polysiloxanates, alkylsilane and fluoroalkylsilane.

18. A method comprising:
arranging a plurality of synthetic beads to contact with an aqueous mixture comprising solid hydrophobic particles having mineral particles with hydrophobic elements attached thereon, said synthetic bead comprising:
a surface, and
a synthetic material provided on the surface, the synthetic material comprises a plurality of molecules configured to render the surface hydrophobic, the molecules also being configured to attract the solid hydrophobic particles to the surface in the aqueous mixture, wherein the solid-phase body comprises an outer part made of glass, ceramic or a polymer, and wherein the synthetic material comprise a siloxane derivative, or polysiloxanates, hydroxyl-terminated polydimethylsiloxanes, or is selected from a group consisting of poly(dimethylsiloxane), hydrophobically-modified ethyl hydroxyethyl cellulose polysiloxanates, alkylsilane and fluoroalkylsilane;

allowing the solid hydrophobic particles to attach to the synthetic beads for providing a plurality of enriched synthetic beads, the enriched synthetic beads comprising at least some of the solid hydrophobic particles attached to the surface of the synthetic beads; and releasing said some of the solid hydrophobic particles from the surface of the enriched synthetic beads.

19. The method according to claim 18, wherein the step of releasing comprises washing the enriched synthetic beads with water so as to remove at least some of the solid hydrophobic particles from the surface.

20. The method according to claim 18, wherein the method comprises removing the enriched synthetic beads from the aqueous mixture.

21. A hydrophobic synthetic structure comprising:
a solid-phase body comprising a surface; and
a synthetic material provided on the surface, the synthetic material comprises a plurality of molecules configured to render the surface hydrophobic, and the combination of the molecules and the surface being configured to attract to the surface solid hydrophobic particles having mineral particles contained in an aqueous mixture, wherein the synthetic material comprises a siloxane derivative, or polysiloxanates, hydroxyl-terminated polydimethylsiloxanes, or is selected from a group consisting of poly(dimethylsiloxane), hydrophobically-modified ethyl hydroxyethyl cellulose polysiloxanates, alkylsilane and fluoroalkylsilane.

22. The hydrophobic synthetic structure according to claim 21, wherein the hydrophobic synthetic structure takes the form of either a mesh-like structure, a membrane-like structure, a grooved structure, a grate-like structure, a tubular structure, a hairy structure, a course structure, a smooth structure, a rectangular structure, a honeycomb-like structure, a solid bead, or a two-part bead structure with an inner core and an outer covering, and the surface having a corresponding characteristic based at least partly on the configuration of the corresponding structure.

23. The synthetic bead according to claim 1, comprising a shell for providing the surface.

24. The synthetic bead according to claim 1, only a portion of the surface is configured to be hydrophobic.

25. The synthetic bead according to claim 24, where another portion of the surface is functionalized to have one or more collector molecules.

26. The synthetic bead according to claim 1, where a portion of the surface is configured to be hydrophobic.

27. The synthetic bead according to claim 1, comprising a porous body for providing the surface.

28. The synthetic bead according to claim 1, wherein the solid-phase body is configured to be magnetic, or para-, ferri- or ferro-magnetic.

29. The method according to claim 17, wherein the synthetic bead has a different density than the aqueous mixture so as to float or sink therein.

30. The method according to claim 17, wherein the synthetic bead has substantially the same density as the aqueous mixture so as to neither float nor sink therein.

31. The method according to claim 17, wherein the surface comprises physical structures configured to trap the mineral particles.

32. The method according to claim 31, wherein the physical structures comprise grooves or dents.

33. The method according to claim 32, wherein the physical structures comprise hair-like structures.

34. The method according to claim 17, wherein the mineral particles have a maximum size and the solid-phase body has a body size greater than the maximum size.

35. The method according to claim 17, wherein the mineral particles have a minimum size and the solid-phase body has a body size smaller than the minimum size.

36. The method according to claim 17, wherein the surface is also configured with a functional group so as to be a collector for also attracting the mineral particles to the surface.

37. The method according to claim 17, wherein the synthetic beads are configured with a size less than 100 μm for attracting to mineral particles having a substantially similar size, including in applications related to flotation cells.

38. The method according to claim 17, wherein the synthetic beads are configured with a size of about 100 μm for attracting or attaching to mineral particles having a substantially similar size, smaller size or larger size.

39. The method according to claim 17, wherein the synthetic beads are configured with a size in a range of about 50-500 μm for attracting or attaching to mineral particles having a substantially similar size.

40. The method according to claim 17, wherein the synthetic beads are configured with a size about 200 μm for attracting or attaching to mineral particles having a substantially similar size.

41. The method according to claim 17, wherein the synthetic beads are configured with a size in a range of about 1 mm to 10 mm, including in applications related to a tailings pond.

42. The method according to claim 17, wherein the synthetic beads are configured with a size in a range of about 50 μm to 10 mm.

* * * * *